US012401980B2

(12) United States Patent
Bian et al.

(10) Patent No.: US 12,401,980 B2
(45) Date of Patent: Aug. 26, 2025

(54) METHOD FOR DISPLAYING BLUETOOTH DEVICE IDENTIFIER AND ELECTRONIC DEVICE

(71) Applicant: Huawei Technologies Co., Ltd., Shenzhen (CN)

(72) Inventors: Sucheng Bian, Nanjing (CN); Zhongyin Jiang, Nanjing (CN); Le Chen, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 431 days.

(21) Appl. No.: 17/911,039

(22) PCT Filed: Feb. 27, 2021

(86) PCT No.: PCT/CN2021/078329
§ 371 (c)(1),
(2) Date: Sep. 12, 2022

(87) PCT Pub. No.: WO2021/179924
PCT Pub. Date: Sep. 16, 2021

(65) Prior Publication Data
US 2023/0106906 A1 Apr. 6, 2023

(30) Foreign Application Priority Data
Mar. 11, 2020 (CN) .......................... 202010167251.4

(51) Int. Cl.
*H04W 4/80* (2018.01)
*H04W 76/11* (2018.01)
(52) U.S. Cl.
CPC .............. *H04W 4/80* (2018.02); *H04W 76/11* (2018.02)

(58) Field of Classification Search
CPC ................................ H04W 4/80; H04W 76/11
See application file for complete search history.

(56) References Cited

U.S. PATENT DOCUMENTS

| 2013/0005257 A1* | 1/2013 | Rajaraman | H04W 8/005 455/41.2 |
| 2014/0011448 A1* | 1/2014 | Yang | H04B 5/00 455/41.1 |

(Continued)

FOREIGN PATENT DOCUMENTS

| CN | 104506214 A | 4/2015 |
| CN | 105373297 A | 3/2016 |

(Continued)

OTHER PUBLICATIONS

"RAN4#85 Meeting report," R4-18xxxxx, 3GPP TSG-RAN WG4 Meeting #86, Athens, Greece, Feb. 26-Mar. 2, 2018, 831 pages.

*Primary Examiner* — David Bilodeau
(74) *Attorney, Agent, or Firm* — Conley Rose, P.C.

(57) ABSTRACT

A method for displaying a BLUETOOTH device identifier includes a first electronic device that broadcasts a first BLUETOOTH packet. The first BLUETOOTH packet includes first indication information. A second electronic device broadcasts a second BLUETOOTH packet. A third electronic device displays a BLUETOOTH scanning interface, and scans a third BLUETOOTH packet. The third electronic device displays the first link identifier and a second link identifier on the BLUETOOTH scanning interface in response to receiving the first BLUETOOTH packet and the second BLUETOOTH packet. The third electronic device displays the first link identifier in the highlighting manner on the BLUETOOTH scanning interface in response to the first BLUETOOTH packet comprising the first indication information.

20 Claims, 21 Drawing Sheets

(56) References Cited

U.S. PATENT DOCUMENTS

| | | | |
|---|---|---|---|
| 2014/0206290 A1 | 7/2014 | Lee | |
| 2014/0364060 A1* | 12/2014 | Srivatsa | H04W 4/80 |
| | | | 455/41.2 |
| 2016/0226713 A1* | 8/2016 | Dellinger | H04M 1/72412 |
| 2016/0262093 A1 | 9/2016 | Ren et al. | |
| 2016/0309286 A1* | 10/2016 | Son | H04W 4/80 |
| 2018/0063310 A1* | 3/2018 | McGary | H04M 1/72412 |
| 2018/0262866 A1* | 9/2018 | Haverinen | H04B 17/20 |
| 2020/0128394 A1* | 4/2020 | Han | H04W 8/28 |
| 2020/0336897 A1* | 10/2020 | Ledvina | H04W 12/71 |
| 2020/0374954 A1* | 11/2020 | Chen | H04W 12/50 |
| 2022/0272399 A1* | 8/2022 | Zhang | H04M 1/72412 |

FOREIGN PATENT DOCUMENTS

| | | |
|---|---|---|
| CN | 105468325 A | 4/2016 |
| CN | 105912115 A | 8/2016 |
| CN | 107087247 A | 8/2017 |
| CN | 107295092 A | 10/2017 |
| CN | 107666661 A | 2/2018 |
| CN | 104540190 B | 4/2018 |
| CN | 108271143 A | 7/2018 |
| CN | 108616655 A | 10/2018 |
| CN | 105703807 B | 2/2019 |
| CN | 105792106 B | 3/2019 |
| CN | 110519741 A | 11/2019 |
| CN | 111464987 A | 7/2020 |
| EP | 4106366 A1 | 12/2022 |
| KR | 101668394 B1 | 10/2016 |
| WO | 2016007186 A1 | 1/2016 |

\* cited by examiner

METHOD FOR DISPLAYING BLUETOOTH DEVICE IDENTIFIER AND ELECTRONIC DEVICE

CROSS-REFERENCE TO RELATED APPLICATIONS

This is a U.S. National Stage of International Patent Application No. PCT/CN2021/078329 filed on Feb. 27, 2021, which claims priority to Chinese Patent Application No. 202010167251.4 filed on Mar. 11, 2020. Both of the aforementioned applications are hereby incorporated by reference in their entireties.

TECHNICAL FIELD

Embodiments of this application relate to the field of wireless communication technologies, and in particular, to a method for displaying a Bluetooth device identifier and an electronic device.

BACKGROUND

Bluetooth is a radio technology that supports short-range communication between devices. With the development of science and technology, increasingly more electronic devices with a Bluetooth function appear in people's daily lives. Within a Bluetooth communication range, if Bluetooth is enabled on two electronic devices with a Bluetooth function, the two electronic devices may perform Bluetooth pairing, and after the Bluetooth pairing succeeds, data transmission may be performed between the two electronic devices.

In a Bluetooth pairing process, each electronic device under Bluetooth scanning may display a link identifier corresponding to a received Bluetooth packet for a user to view. The user may view, by using the electronic device, an electronic device corresponding to the link identifier, and may select, by using the electronic device, an electronic device for Bluetooth pairing. Because the electronic device displays a plurality of link identifiers corresponding to a plurality of Bluetooth device identifiers within a Bluetooth communication range, the user cannot quickly find, from the plurality of link identifiers, the electronic device for Bluetooth pairing.

SUMMARY

This application provides a method for displaying a Bluetooth device identifier and an electronic device. The electronic device displays, in a highlighting manner, a link identifier corresponding to a Bluetooth device, to reduce difficulty for a user to search for an identifier of a Bluetooth device for Bluetooth pairing.

To achieve the foregoing technical objective, the following technical solutions are used in embodiments of this application.

According to a first aspect, this application provides a method for displaying a Bluetooth device identifier. In the method, a first electronic device may broadcast a first Bluetooth packet. The first Bluetooth packet includes first indication information used to indicate to display, in a highlighting manner, a first link identifier corresponding to the first electronic device. A second electronic device may broadcast a second Bluetooth packet. A third electronic device may display a Bluetooth scanning interface, and scan a Bluetooth packet. The third electronic device may receive the first Bluetooth packet broadcast by the first electronic device and the second Bluetooth packet broadcast by the second electronic device. The third electronic device may display the first link identifier and a second link identifier on the Bluetooth scanning interface in response to receiving the first Bluetooth packet and the third Bluetooth packet. The first link identifier corresponds to the first electronic device, and the second link identifier corresponds to the second electronic device.

The third electronic device displays the first link identifier in the highlighting manner on the Bluetooth scanning interface in response to the fact that the first Bluetooth packet includes the first indication information.

It may be understood that the first Bluetooth packet broadcast by the first electronic device includes the first indication information, and the first indication information is used to indicate to display, in the highlighting manner, a link identifier corresponding to the first electronic device. In this way, when receiving the first Bluetooth packet broadcast by the first electronic device, the third electronic device displays the first link identifier in the highlighting manner in response to the first indication information in the first Bluetooth packet. Because the first link identifier corresponding to the first electronic device is highlighted, the user can quickly find the first link identifier from the Bluetooth scanning interface, so as to determine the first electronic device. If the user of the third electronic device wants to control the third electronic device to establish a Bluetooth connection to the first electronic device, and the third electronic device displays the first link identifier in the highlighting manner, the user of the third electronic device can quickly find the first link identifier from the Bluetooth scanning interface, so as to trigger the third electronic device to establish the Bluetooth connection to the first electronic device.

In a possible implementation, displaying the first link identifier in the highlighting manner includes at least one of the following: displaying the first link identifier before the second link identifier, displaying the first link identifier being selected, or displaying the first link identifier in a distinctive highlighting manner.

It is assumed that the user of the third electronic device wants to control the third electronic device to establish the Bluetooth connection to the first electronic device. When the user sequentially views link identifiers according to a sequence on the Bluetooth scanning interface of the third electronic device, the third electronic device displays the first link identifier before another link identifier (the second link identifier), so that the user can quickly find, on the Bluetooth scanning interface displayed by the third electronic device, the first link identifier corresponding to the first electronic device. When the third electronic device displays the first link identifier being selected, or the third electronic device displays the first link identifier in a distinctive highlighting manner, the user can quickly find, on the Bluetooth scanning interface displayed by the third electronic device, the first link identifier corresponding to the first electronic device. This helps the user quickly find, on the Bluetooth scanning interface of the third electronic device, the first link identifier corresponding to the first electronic device. In conclusion, displaying the first link identifier in the highlighting manner reduces difficulty for the user to search for the first link identifier corresponding to the first electronic device, so that the user can quickly find the first link identifier corresponding to the first electronic device.

In another possible implementation, that the third electronic device displays the first link identifier in the highlighting manner on the Bluetooth scanning interface may specifically include: The third electronic device displays the first link identifier in the highlighting manner on the Bluetooth scanning interface within first preset duration starting from a moment when the third electronic device receives the first Bluetooth packet. That is, within the first preset duration, a manner of displaying the first link identifier on the Bluetooth scanning interface of the third electronic device remains unchanged, so that the user can find the first link identifier within preset time, to improve user experience.

In another possible implementation, before the third electronic device responds to receiving the first Bluetooth packet and the second Bluetooth packet, the third electronic device may further display motion prompt information on the Bluetooth scanning interface. The motion prompt information is used to indicate a motion status that meets a preset condition.

It may be understood that when the third electronic device displays the motion prompt information on the Bluetooth scanning interface, any user can learn of the motion status that meets the preset condition when viewing the Bluetooth scanning interface of the third electronic device. When a user of the first electronic device and the user of the third electronic device want to control the first electronic device and the third electronic device to establish the Bluetooth connection, the user of the first electronic device may view the motion prompt information displayed on the Bluetooth scanning interface of the third electronic device, to trigger a motion status of the first electronic device to change under the preset condition.

In another possible implementation, if the first Bluetooth packet broadcast by the first electronic device includes the first indication information, before the first electronic device broadcasts the first Bluetooth packet, the method may further include: The first electronic device detects that the motion status of the first electronic device changes under the preset condition. That is, before broadcasting the first Bluetooth packet, the first electronic device has detected that the motion status of the first electronic device changes under the preset condition.

Specifically, the first electronic device may include a sensor module. The first electronic device may obtain sensor data obtained by the sensor module, and determine, based on the sensor data, that the motion status of the first electronic device changes under the preset condition.

It may be understood that, if the first electronic device detects that the motion status of the first electronic device changes under the preset condition, the first Bluetooth packet broadcast by the first electronic device includes the first indication information. That is, if a Bluetooth packet broadcast by an electronic device includes indication information (for example, the first indication information), and the indication information is used to indicate to display, in a highlighting manner, a link identifier (for example, the first link identifier) corresponding to the Bluetooth packet, a motion status of the electronic device (for example, the first electronic device) that broadcasts the Bluetooth packet changes under a condition. If the Bluetooth packet broadcast by the electronic device does not include the indication information (for example, the first indication information), the motion status of the electronic device (for example, the second electronic device) does not change according to the condition. In conclusion, the third electronic device may display, in the highlighting manner, a link identifier corresponding to a Bluetooth packet including the first indication information, so that the user can quickly find, from the Bluetooth scanning interface, a link identifier of a Bluetooth device whose motion status changes under the preset condition.

In another possible implementation, the method further includes: The first electronic device may keep broadcasting the first Bluetooth packet within second preset duration starting from a moment when the first electronic device detects that the motion status of the first electronic device changes under the preset condition.

It may be understood that, if the first electronic device detects that the motion status of the first electronic device changes under the preset condition, the first electronic device keeps broadcasting the first Bluetooth packet within the second preset duration. In this way, within the second preset duration, the third electronic device displays the first link identifier in the highlighting manner on the Bluetooth scanning interface, to reduce difficulty for the user of the third electronic device to search for the first link identifier on the Bluetooth scanning interface, and improve user experience.

In another possible implementation, the method further includes: The first electronic device broadcasts a third Bluetooth packet after the second preset duration starting from a moment when the first electronic device detects that the motion status of the first electronic device changes under the preset condition. The third Bluetooth packet does not include the first indication information.

In another possible implementation, different electronic devices may log in to a same account. For example, both the first electronic device and a fourth electronic device may log in to a first account. If the first electronic device logs in to the first account, the first Bluetooth packet may further include the first account. The fourth electronic device may receive the first Bluetooth packet. That is, the first Bluetooth packet received by the fourth electronic device may include not only the first indication information, but also the first account. In response to the fact that the first Bluetooth packet of the fourth electronic device includes the first indication information, and the fourth electronic device logs in to the first account, that is, the first electronic device and the fourth electronic device log in to the same account, the fourth electronic device may broadcast a fourth Bluetooth packet including second indication information. The second indication information is used to indicate that a motion status of the fourth electronic device changes under the preset condition. In other words, even if the motion status of the fourth electronic device does not change under the preset condition, if the motion status of the first electronic device changes under the preset condition, the fourth electronic device receives a Bluetooth packet broadcast by the first electronic device, and the fourth electronic device and the first electronic device log in to the same account, a Bluetooth packet broadcast by the fourth electronic device may also carry indication information (for example, the second indication information), to indicate to display, in the highlighting manner, a third link identifier corresponding to the fourth electronic device.

The third electronic device may receive the fourth Bluetooth packet. The third electronic device may display the third link identifier on the Bluetooth scanning interface in response to receiving the fourth Bluetooth packet. The third link identifier corresponds to the fourth electronic device. Specifically, the third electronic device indicates to display the third link identifier in the highlighting manner on the Bluetooth scanning interface in response to the fact that the fourth Bluetooth packet includes the second indication information.

It may be understood that electronic devices logging in to a same account are generally devices of a same user. When both the first electronic device and the fourth electronic device log in to the first account, and the user wants to control the third electronic device to establish a Bluetooth connection to the fourth electronic device, the user may trigger the motion status of the first electronic device to change under the preset condition. In this way, the first Bluetooth packet broadcast by the first electronic device may include the first account and the first indication information. After the fourth electronic device receives the first Bluetooth packet broadcast by the first electronic device, the fourth electronic device may broadcast a Bluetooth packet including the second indication information. In this way, the third electronic device receives the Bluetooth packet including the second indication information, and the third electronic device may display, in the highlighting manner on the Bluetooth scanning interface, the third link identifier corresponding to the fourth electronic device. In this way, the user of the third electronic device can quickly find the third link identifier from the Bluetooth scanning interface, so as to trigger the third electronic device to establish the Bluetooth connection to the fourth electronic device.

In another possible implementation, the fourth Bluetooth packet may further include the first account, the first Bluetooth packet broadcast by the first electronic device includes the first account and the first indication information, and the third electronic device receives the fourth Bluetooth packet. That is, both the first Bluetooth packet and the fourth Bluetooth packet that are received by the third electronic device include the first account. The third electronic device displays the third link identifier in the highlighting manner on the Bluetooth scanning interface in response to the fact that the fourth Bluetooth packet includes the first account.

It may be understood that, after receiving the fourth Bluetooth packet, the third electronic device responds to that the fourth Bluetooth packet includes the first account, that is, the first electronic device and the fourth electronic device log in to the same account. In other words, even if the motion status of the fourth electronic device does not change under the preset condition, if the motion status of the first electronic device changes under the preset condition, the third electronic device still displays the third link identifier in the highlighting manner.

According to a second aspect, this application further provides a method for displaying a Bluetooth device identifier. The method may be applied to the third electronic device in the first aspect. In the method, the third electronic device displays a Bluetooth scanning interface, and scans a Bluetooth packet. The third electronic device may receive a first Bluetooth packet that is from a first electronic device and includes first indication information. The first indication information is used to indicate to display, in a highlighting manner, a first link identifier corresponding to the first electronic device. The third electronic device may further receive a second Bluetooth packet from a second electronic device. The third electronic device displays the first link identifier and a second link identifier on the Bluetooth scanning interface in response to receiving the first Bluetooth packet and the second Bluetooth packet. The first link identifier corresponds to the first electronic device, and the second link identifier corresponds to the second electronic device.

The third electronic device displays the first link identifier in the highlighting manner on the Bluetooth scanning interface in response to the fact that the first Bluetooth packet includes the first indication information.

In a possible implementation, before the third electronic device displays the first link identifier and the second link identifier on the Bluetooth scanning interface in response to receiving the first Bluetooth packet and the second Bluetooth packet, the method further includes: The third electronic device may further display motion prompt information on the Bluetooth scanning interface. The motion prompt information is used to indicate a motion status that meets a preset condition.

In another possible implementation, that the third electronic device displays the first link identifier in the highlighting manner on the Bluetooth scanning interface may specifically include: The third electronic device displays the first link identifier in the highlighting manner on the Bluetooth scanning interface within first preset duration starting from a moment when the third electronic device receives the first Bluetooth packet.

In another possible implementation, the first electronic device logs in to a first account, and the first Bluetooth packet further includes the first account. The method further includes. The third electronic device receives a fourth Bluetooth packet from a fourth electronic device. The fourth Bluetooth packet includes the first account. The third electronic device displays a third link identifier on the Bluetooth scanning interface in response to receiving the fourth Bluetooth packet. The third link identifier corresponds to the fourth electronic device.

The third electronic device displays the third link identifier in the highlighting manner on the Bluetooth scanning interface in response to the fact that the fourth Bluetooth packet includes the first account.

According to a third aspect, this application further provides a method for displaying a Bluetooth device identifier. The method may be applied to the first electronic device in the first aspect. The method may include: A first electronic device broadcasts a first Bluetooth packet. The first Bluetooth packet includes first indication information, and the first indication information is used to indicate to display, in a highlighting manner, a first link identifier corresponding to the first electronic device.

In a possible implementation, before the first electronic device broadcasts the first Bluetooth packet, the method may further include: The first electronic device detects that a motion status of the first electronic device changes under a preset condition.

In another possible implementation, the method may further include: The first electronic device broadcasts the first Bluetooth packet within second preset duration starting from a moment when the first electronic device detects that the motion status of the first electronic device changes under the preset condition.

In another possible implementation, the method may further include: The first electronic device broadcasts a third Bluetooth packet after the second preset duration starting from a moment when the first electronic device detects that the motion status of the first electronic device changes under the preset condition. The third Bluetooth packet does not include the first indication information.

In another possible implementation, the first electronic device logs in to a first account, and that the first electronic device broadcasts the first Bluetooth packet specifically includes:

The first electronic device receives a fifth Bluetooth packet from a fifth electronic device. The fifth Bluetooth packet includes third indication information and the first account, and the third indication information is used to indicate that a motion status of the fifth electronic device changes under the preset condition. In response to the fact that the first electronic device logs in to the first account and the fifth Bluetooth packet includes the third indication information, the first electronic device broadcasts the first Bluetooth packet including the first indication information.

According to a fourth aspect, an embodiment of this application further provides an apparatus for displaying a Bluetooth device identifier, included in a third electronic device. The apparatus for displaying a Bluetooth device identifier includes: a scanning module, a receiving module, and a display module.

The scanning module is configured to scan a Bluetooth packet when the third electronic device displays a Bluetooth scanning interface. The receiving module is configured to receive a first Bluetooth packet from a first electronic device and receive a second Bluetooth packet from a second electronic device. The first Bluetooth packet includes first indication information, and the first indication information is used to indicate to display, in a highlighting manner, a first link identifier corresponding to the first electronic device. The display module is configured to display, by the third electronic device, the first link identifier and a second link identifier on the Bluetooth scanning interface in response to receiving the first Bluetooth packet and the second Bluetooth packet. The first link identifier corresponds to the first electronic device, and the second link identifier corresponds to the second electronic device. The third electronic device displays the first link identifier in the highlighting manner on the Bluetooth scanning interface in response to the fact that the first Bluetooth packet includes the first indication information.

In a possible implementation, the display module is further configured to display motion prompt information on the Bluetooth scanning interface. The motion prompt information is used to indicate a motion status that meets a preset condition.

In another possible implementation, the display module is further configured to display, by the third electronic device, the first link identifier in the highlighting manner on the Bluetooth scanning interface within first preset duration starting from a moment when the third electronic device receives the first Bluetooth packet.

In another possible implementation, the first electronic device logs in to a first account, and the first Bluetooth packet may further include the first account. The receiving module is further configured to receive a fourth Bluetooth packet from a fourth electronic device. The fourth Bluetooth packet includes the first account. The display module is further configured to display a third link identifier on the Bluetooth scanning interface in response to receiving the fourth Bluetooth packet. The third link identifier corresponds to the fourth electronic device.

The third electronic device displays the third link identifier in the highlighting manner on the Bluetooth scanning interface in response to the fact that the fourth Bluetooth packet includes the first account.

According to a fifth aspect, an embodiment of this application further provides an apparatus for displaying a Bluetooth device identifier, included in a first electronic device. The apparatus for displaying a Bluetooth device identifier may include a Bluetooth broadcasting module. The Bluetooth broadcasting module is configured to broadcast a first Bluetooth packet. The first Bluetooth packet includes first indication information, and the first indication information is used to indicate to display, in a highlighting manner, a first link identifier corresponding to the first electronic device.

In a possible implementation, the apparatus may further include a detection module. The detection module is configured to detect that a motion status of the first electronic device changes under a preset condition.

In another possible implementation, the Bluetooth broadcasting module is further configured to broadcast, by the first electronic device, the first Bluetooth packet within second preset duration starting from a moment when the first electronic device detects that the motion status of the first electronic device changes under the preset condition.

In another possible implementation, the Bluetooth broadcasting module is further configured to broadcast, by the first electronic device, a third Bluetooth packet after the second preset duration starting from a moment when the first electronic device detects that the motion status of the first electronic device changes under the preset condition. The third Bluetooth packet does not include the first indication information.

In another possible implementation, the first electronic device logs in to a first account, and the apparatus for displaying a Bluetooth device may further include a Bluetooth receiving module.

The Bluetooth receiving module may be configured to receive a fifth Bluetooth packet from a fifth electronic device. The fifth Bluetooth packet includes third indication information and the first account, and the third indication information is used to indicate to display, in the highlighting manner, a link identifier corresponding to the fifth electronic device. The Bluetooth broadcasting module is further configured to broadcast, by the first electronic device, in response to the fact that the fifth Bluetooth packet includes the third indication information and the first electronic device logs in to the first account, the first Bluetooth packet including the first indication information.

According to a sixth aspect, this application further provides an electronic device. The electronic device is the third electronic device. The third electronic device may include a memory, a Bluetooth module, a display, and one or more processors, and the memory, the Bluetooth module, the display, and the processor are coupled. The memory is configured to store computer program code, the computer program code includes computer instructions, and when the processor executes the computer instructions, the third electronic device is enabled to perform a step corresponding to the third electronic device according to any one of the first aspect, the second aspect, or the possible implementations of the first aspect and the second aspect.

According to a seventh aspect, this application further provides a chip system. The chip system is used in an electronic device, and the chip system may include one or more interface circuits and one or more processors. The interface circuit and the processor are interconnected through a line. The interface circuit is configured to: receive a signal from a memory of the electronic device, and send the signal to the processor. The signal includes computer instructions stored in the memory. When the processor executes the computer instructions, the electronic device performs the method according to any one of the first aspect, the second aspect, or the possible implementations of the first aspect and the second aspect.

According to an eighth aspect, this application further provides a computer-readable storage medium, including computer instructions. When the computer instructions are run on an electronic device, the electronic device is enabled to perform the method according to any one of the first aspect, the second aspect, or the possible implementations of the first aspect and the second aspect.

According to a ninth aspect, this application further provides an electronic device. The electronic device is the first electronic device, the first electronic device may include a memory, a Bluetooth module, and one or more processors, and the memory, the Bluetooth module, and the processor are coupled. The memory is configured to store computer program code, the computer program code includes computer instructions, and when the processor executes the computer instructions, the first electronic device is enabled to perform a step corresponding to the first electronic device according to any one of the first aspect, the third aspect, or the possible implementations of the first aspect and the third aspect.

According to a tenth aspect, this application further provides a chip system. The chip system is used in an electronic device, and the chip system may include one or more interface circuits and one or more processors. The interface circuit and the processor are interconnected through a line. The interface circuit is configured to: receive a signal from a memory of the electronic device, and send the signal to the processor. The signal includes computer instructions stored in the memory. When the processor executes the computer instructions, the electronic device performs the method according to any one of the first aspect, the third aspect, or the possible implementations of the first aspect and the third aspect.

According to an eleventh aspect, this application further provides a computer-readable storage medium, including computer instructions. When the computer instructions are run on an electronic device, the electronic device is enabled to perform the method according to any one of the first aspect, the third aspect, or the possible implementations of the first aspect and the third aspect.

According to a twelfth aspect, this application further provides a computer program product. When the computer program product runs on a computer, the computer is enabled to perform the method according to any one of the first aspect, the second aspect, or the third aspect and the possible implementations of the first aspect, the second aspect, or the third aspect.

It may be understood that, for beneficial effects that can be achieved by the method in any one of the second aspect, the third aspect, or the possible implementations of the second aspect and the third aspect, the apparatus for displaying a Bluetooth device in any one of the fourth aspect, the fifth aspect, or the possible implementations of the fourth aspect and the fifth aspect, the electronic device in the sixth aspect, the chip system in the seventh aspect, the computer-readable storage medium in the eighth aspect, the electronic device in the ninth aspect, the chip system in the tenth aspect, the computer-readable storage medium in the eleventh aspect, and the computer program product in the twelfth aspect provided in this application, refer to beneficial effects in any one of the first aspect or the possible implementations of the first aspect. Details are not described herein again.

DESCRIPTION OF EMBODIMENTS

Figure 1A:
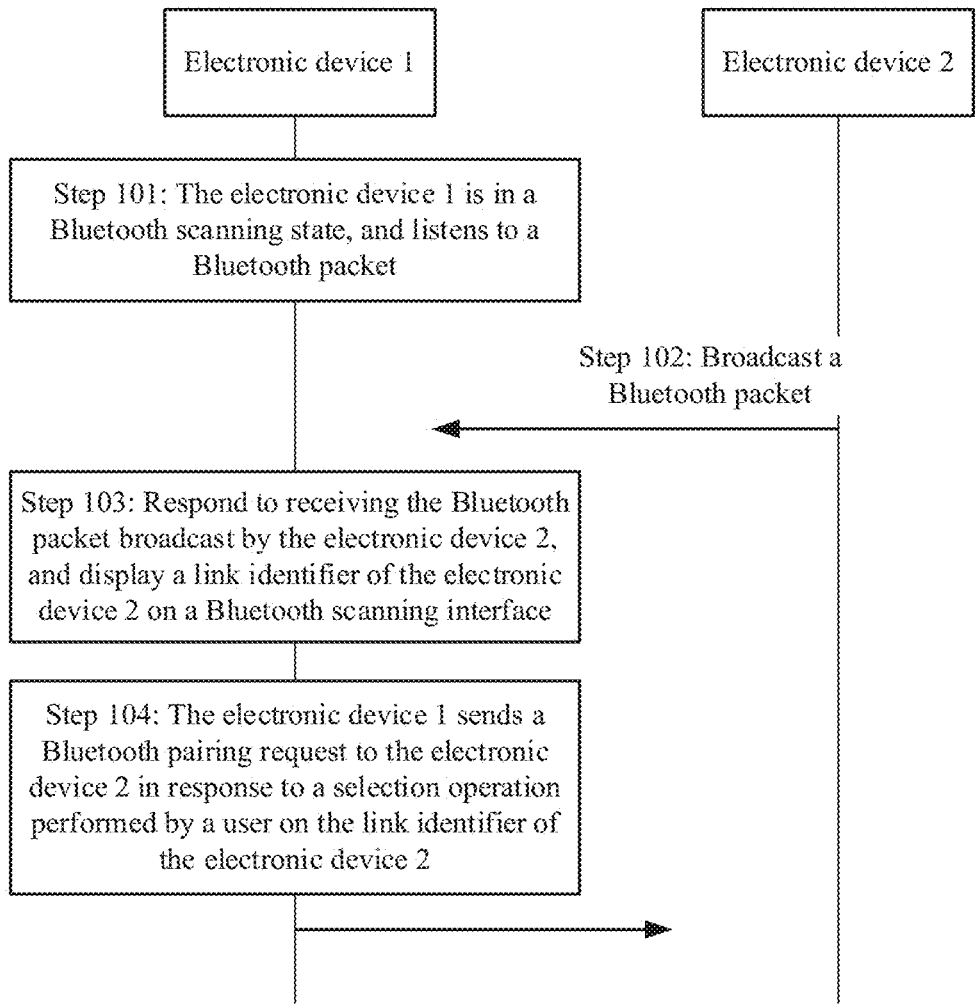
FIG. 1A is a flowchart of a method for establishing Bluetooth communication according to an embodiment of this application.

Terms "first" and "second" below are merely intended for a purpose of description, and shall not be understood as an indication or implication of relative importance or implicit indication of a quantity of indicated technical features. Therefore, a feature limited by "first" or "second" may explicitly or implicitly include one or more features. In the descriptions of embodiments, unless otherwise specified, "a plurality of" means two or more than two.

A working principle of Bluetooth communication is a socket (Socket) mechanism. That two electronic devices perform Bluetooth communication is used as an example. A Socket is actually a communication endpoint, both the two electronic devices have a Socket, and the two electronic devices may transmit data by using the Socket.

A socket of each electronic device may be a sequence number. For example, a format of the Socket is as follows: (Internet Protocol (Internet Protocol, IP) address: port number). For example, an IP address of an electronic device is 210.37.145.1, and a port number of the electronic device is 23. In this case, a socket of the electronic device is (210.37.145.1:23).

A socket is a communication endpoint in a communication connection, and a plurality of electronic devices may transmit data by using the socket. In an example in which two electronic devices transmit data, one electronic device writes to-be-transmitted data into a Socket of the electronic device, and the electronic device sends the Socket to the other electronic device. After receiving the Socket, the other electronic device may store information in the received Socket in a Socket of the electronic device. In this way, the two electronic devices complete data transmission.

After two electronic devices establish Bluetooth communication, one of the two electronic devices may serve as a server, and the other electronic device may serve as a client. Specifically, in a process in which two electronic devices establish Bluetooth communication, an electronic device that actively initiates a Bluetooth communication request is a client, and the other electronic device is a server.

A specific process of establishing Bluetooth communication is as follows: The electronic device serving as the client establishes a Socket, and sends a Bluetooth connection request (or referred to as a Bluetooth packet) to the electronic device serving as the server by using the Socket, to request to establish a Bluetooth communication connection to the electronic device serving as the server. In addition, the electronic device serving as the server also establishes a Socket, and may detect, by using the Socket, the Bluetooth connection request sent by the electronic device serving as the client. If the electronic device serving as the server establishes, in response to the Bluetooth connection request of the electronic device serving as the server, the Bluetooth communication connection to the electronic device serving as the client, because both the electronic device serving as the server and the electronic device serving as the client have a Socket, the two electronic devices may transmit data by using the Socket.

A process of establishing Bluetooth communication between an electronic device 1 and an electronic device 2 is used as an example. The process of establishing Bluetooth communication between the two electronic devices includes discovery, pairing, and connection. For example, Bluetooth of the electronic device 1 discovers Bluetooth of the electronic device 2, and the electronic device 1 performs Bluetooth pairing with the electronic device 2 in response to an operation of a user. After the Bluetooth pairing between the electronic device 1 and the electronic device 2 succeeds, Bluetooth communication is established between the electronic device 1 and the electronic device 2.

A method procedure of a discovery and pairing process when establishing Bluetooth communication is shown in FIG. 1A. The method includes step 101 to step 104.

Step 101: The electronic device 1 is in a Bluetooth scanning state, and listens to a Bluetooth packet.

When the electronic device 1 scans Bluetooth packets, the electronic device 1 may detect Bluetooth packets broadcast by a plurality of electronic devices within a Bluetooth communication range. In this embodiment of this application, that a Bluetooth communication connection is established between the electronic device 1 and the electronic device 2 is used as an example. FIG. 1A shows only an interaction process between the electronic device 1 and the electronic device 2, and does not show another electronic device within the Bluetooth communication range. It may be understood that, when scanning the Bluetooth packets, the electronic device 1 may further detect a Bluetooth packet broadcast by another electronic device within the Bluetooth communication range.

Step 102: The electronic device 2 broadcasts a Bluetooth packet.

The Bluetooth packet is used to request to establish a Bluetooth communication connection to the electronic device 1.

Step 103: The electronic device 1 responds to receiving the Bluetooth packet broadcast by the electronic device 2, and displays a link identifier of the electronic device 2 on a Bluetooth scanning interface.

The electronic device 1 may display a link identifier according to a preset display rule, so that the user views the link identifier on the electronic device 1. The preset display rule may be time at which a Bluetooth packet is detected, signal strength in the Bluetooth packet, or the like.

Figure 1B:
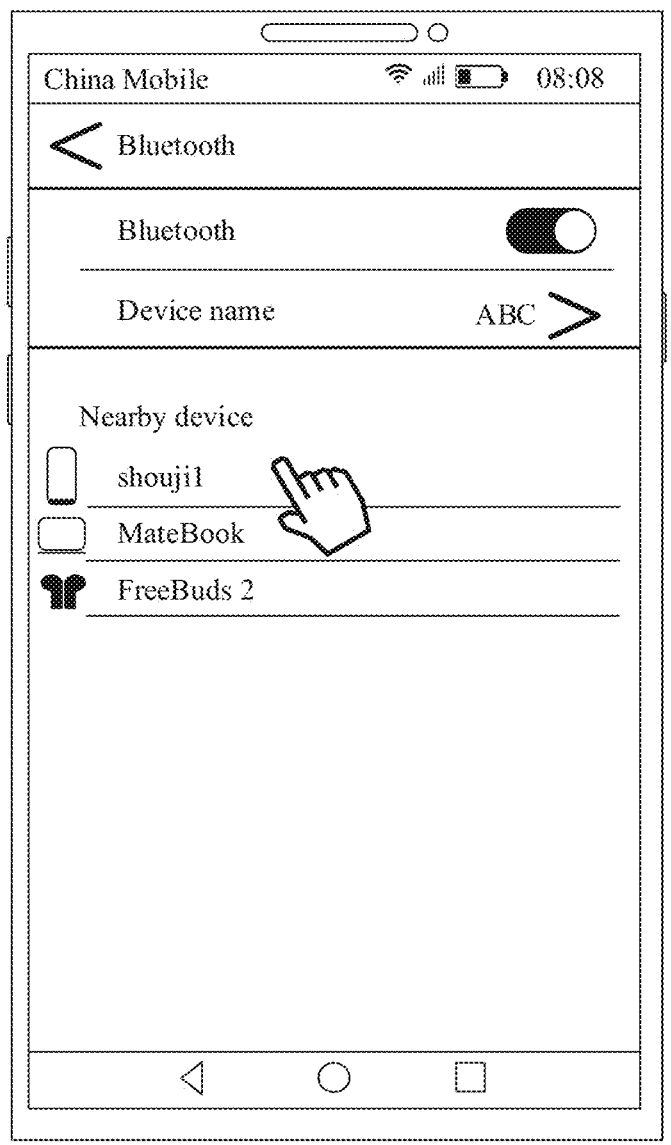
FIG. 1B is a schematic diagram of displaying a Bluetooth identifier by an electronic device according to an embodiment of this application.

It may be understood that, if the electronic device 1 may receive the Bluetooth packets broadcast by the plurality of electronic devices within the Bluetooth communication range, the electronic device 1 may display a plurality of link identifiers on the Bluetooth scanning interface, and each link identifier corresponds to one electronic device. The link identifier displayed on the electronic device 1 may be a device model of the electronic device. If a device model of the electronic device 2 is "shouji1", the Bluetooth scanning interface of the electronic device 1 is shown in FIG. 1B, and the Bluetooth scanning interface of the electronic device 1 includes a link identifier of the electronic device 2 and a link identifier of another electronic device. In addition, the link identifier may alternatively be a Bluetooth name of the electronic device, or the like. This is merely an example herein.

Step 104: The electronic device 1 sends a Bluetooth pairing request to the electronic device 2 in response to a selection operation performed by the user on the link identifier of the electronic device 2.

As shown in FIG. 1B, the link identifier corresponding to the electronic device 2 is "shouji1", and the electronic device 1 receives a tap operation performed by the user on the link identifier ("shouji1").

If only the electronic device 2 broadcasts the Bluetooth packet within the Bluetooth communication range of the electronic device 1, the Bluetooth scanning interface of the electronic device 1 displays only the link identifier of the electronic device 2. Because an increasing quantity of electronic devices have a Bluetooth function, generally, the electronic device 1 may detect Bluetooth packets of a plurality of electronic devices, and displays link identifiers of the plurality of detected Bluetooth packets on the Bluetooth scanning interface (as shown in FIG. 1B). When the Bluetooth scanning interface of the electronic device 1 displays at least one link identifier, the user cannot quickly find the link identifier of the electronic device 2 from the plurality of link identifiers. Particularly, if the electronic device 1 detects a large quantity of Bluetooth packets, a quantity of link identifiers displayed on the Bluetooth scanning interface of the electronic device 1 also increases. Consequently, it is more difficult for the user to search for the link identifier of the electronic device 2.

This embodiment of this application provides a method for displaying a Bluetooth device identifier. The method may be applied to a process in which the electronic device 1 displays a link identifier (a Bluetooth device name) during Bluetooth communication establishment. The electronic device 2 broadcasting the Bluetooth packet may set indication information in the Bluetooth packet, and the indication information is used to indicate to display, in a highlighting manner, the link identifier (for example, a first link identifier) corresponding to the electronic device 2. The electronic device 1 receiving the Bluetooth packet may display, in the highlighting manner m response to the indication information, the link identifier corresponding to the electronic device 2, so that the user can easily find the link identifier of the electronic device 2. Therefore, when viewing the link identifier on the Bluetooth scanning interface of the electronic device 1, the user can quickly find the link identifier of the electronic device 2. This improves user experience.

It should be noted that, when the electronic device 2 is in a preset state, the electronic device 2 may broadcast the Bluetooth packet including the indication information. The preset state includes but is not limited to: the electronic device 2 is in a "shake" state, or the electronic device 2 is in a "flip" state. For example, if the electronic device 2 is in a "shake" state, the electronic device 2 generates indication information in response to the "shake" motion state, and the electronic device 2 broadcasts the Bluetooth packet including the indication information. In this way, the electronic device 1 displays the link identifier of the electronic device 2 in the highlighting manner in response to the indication information in the Bluetooth packet. This reduces difficulty for the user to search, on the Bluetooth scanning interface displayed on the electronic device 1, for the link identifier corresponding to the electronic device 2.

For example, an electronic device in embodiments of this application may be a mobile phone, a tablet computer, a desktop computer, a laptop computer, a handheld computer, a notebook computer, a vehicle-mounted device, an ultra-mobile personal computer (ultra-mobile personal computer, UMPC), a netbook, a cellular phone, a personal digital assistant (personal digital assistant, PDA), or an augmented reality (augmented reality, AR) device/a virtual reality (virtual reality, VR) device. A specific form of the electronic device is not specifically limited in embodiments of this application.

For example, a Bluetooth communication range includes an electronic device 1, an electronic device 2, an electronic device 3, and an electronic device 4. Each electronic device is provided with a Bluetooth module, and each electronic device may broadcast a Bluetooth packet. For example, the electronic device 1, the electronic device 2, the electronic device 3, and the electronic device 4 may all broadcast Bluetooth packets. For example, the electronic device 1 (a third electronic device) is in a Bluetooth scanning state, and the electronic device 1 may receive Bluetooth packets broadcast by the electronic device 2, the electronic device 3, and the electronic device 4. Similarly, if the electronic device 2, the electronic device 3, and the electronic device 4 are in the Bluetooth scanning state, the electronic device 2, the electronic device 3, and the electronic device 4 may also receive a Bluetooth packet broadcast by the electronic device 1. If the electronic device 2 (a first electronic device) detects, before broadcasting the Bluetooth packet, that a motion status of the electronic device 2 changes under a preset condition, a Bluetooth packet (a first Bluetooth packet) broadcast by the electronic device 2 includes first indication information.

For example, it is assumed that the electronic device 1 is a mobile phone 1. The mobile phone 1 may apply the method in this embodiment of this application in the following scenarios, and the method in this embodiment of this application may be applied to the following scenarios.

Scenario 1: The mobile phone 1 shares data with a mobile phone 2.

Specifically, before sharing data with the mobile phone 2, the mobile phone 1 establishes Bluetooth communication with the mobile phone 2. The mobile phone 1 displays a Bluetooth scanning interface, and scans a Bluetooth packet. The mobile phone 1 may receive a plurality of Bluetooth packets that include a Bluetooth packet of the mobile phone 2, the mobile phone 1 displays link identifiers corresponding to a plurality of electronic devices, and a user of the mobile phone 1 cannot quickly identify a link identifier of the mobile phone 2.

In this case, the method in this embodiment of this application is performed. The mobile phone 2 detects that a motion status of the mobile phone 2 changes under the preset condition. For example, the mobile phone 2 is in a shake state, or the mobile phone 2 is in a flip state. The Bluetooth packet broadcast by the mobile phone 2 includes indication information (the first indication information). In response to receiving the indication information in the Bluetooth packet (the first Bluetooth packet) broadcast by the mobile phone 2, the mobile phone 1 displays, in a highlighting manner, a link identifier (a first link identifier) corresponding to the mobile phone 2.

The displaying the link identifier corresponding to the mobile phone 2 in a highlighting manner includes the following display manners: The link identifier corresponding to the mobile phone 2 is displayed before another link identifier on the Bluetooth scanning interface of the mobile phone 1; the link identifier corresponding to the mobile phone 2 on the Bluetooth scanning interface of the mobile phone 1 further includes a preset identifier; the link identifier corresponding to the mobile phone 2 on the Bluetooth scanning interface of the mobile phone 1 includes the preset identifier, and the link identifier corresponding to the mobile phone 2 is displayed before the another link identifier; the link identifier corresponding to the mobile phone 2 is selected on the Bluetooth scanning interface of the mobile phone 1; and the link identifier corresponding to the mobile phone 2 is displayed in a manner different from that of the another link identifier on the Bluetooth scanning interface of the mobile phone 1, and the like.

Therefore, when using the mobile phone 1 to share data with the mobile phone 2, the user can quickly find the link identifier corresponding to the mobile phone 2. The mobile phone 1 and the mobile phone 2 may establish Bluetooth communication, so that the mobile phone 1 shares data with the mobile phone 2.

Scenario 2: The mobile phone 1 shares data with a Bluetooth headset.

Specifically, before sharing data with the Bluetooth headset, the mobile phone 1 establishes Bluetooth communication with the Bluetooth headset. Because the Bluetooth headset has a memory function, if the mobile phone 1 once established Bluetooth communication with the Bluetooth headset, when Bluetooth of the Bluetooth headset and Bluetooth of the mobile phone 1 are both in an enabled state, the mobile phone 1 may automatically establish Bluetooth communication with the Bluetooth headset. That is, when the mobile phone 1 establishes Bluetooth communication with the Bluetooth headset for the first time, the user of the mobile phone 1 needs to find, based on link identifiers displayed on the Bluetooth scanning interface, a link identifier corresponding to the Bluetooth headset. Because the mobile phone 1 may receive a plurality of Bluetooth packets including a Bluetooth packet of the Bluetooth headset, and display, on the Bluetooth scanning interface, a link identifier corresponding to each electronic device, the user of the mobile phone 1 cannot quickly find the link identifier corresponding to the Bluetooth headset.

In this case, the method in this embodiment of this application is performed. The user may trigger a motion status of the Bluetooth headset to change under the preset condition, for example, the Bluetooth headset is in a shake state. The Bluetooth packet broadcast by the Bluetooth headset may include indication information (the first indication information). The mobile phone 1 responds to receiving a Bluetooth packet that is broadcast by the Bluetooth headset and that includes the indication information. The mobile phone 1 displays the link identifier corresponding to the Bluetooth headset in the highlighting manner, so that the user of the mobile phone 1 can find the link identifier of the Bluetooth headset displayed in the highlighting manner.

The displaying the link identifier corresponding to the Bluetooth headset in the highlighting manner is the same as displaying the link identifier of the mobile phone 2 in the foregoing scenario 1. Details are not described herein again.

Scenario 3: The mobile phone 1 shares data with a notebook computer.

Specifically, before the mobile phone 1 shares data with the notebook computer, the mobile phone 1 establishes Bluetooth communication with the notebook computer. In addition, logged-in accounts on the mobile phone 2 and the notebook computer are the same. For example, a first account is logged in on both the mobile phone 2 and the notebook computer. The mobile phone 1 may receive Bluetooth packets broadcast by the mobile phone 2, the notebook computer, and a tablet computer. The Bluetooth scanning interface of the mobile phone 1 displays link identifiers corresponding to the mobile phone 2, the notebook computer, and the tablet computer. When viewing the Bluetooth scanning interface displayed on the mobile phone 1, the user cannot quickly identify a link identifier corresponding to the notebook computer.

In this case, the method in this embodiment of this application is performed. In a first implementation, the mobile phone 2 detects that a motion status of the mobile phone 2 changes under the preset condition, and the Bluetooth packet broadcast by the mobile phone 2 includes the indication information and the first account. A Bluetooth packet broadcast by the notebook computer includes the first account. The mobile phone 1 responds to the Bluetooth packet of the mobile phone 2 and the Bluetooth packet of the notebook computer. The mobile phone 1 determines that both the Bluetooth packet of the mobile phone 2 and the Bluetooth packet of the notebook computer include the first account, and the mobile phone 1 determines that the Bluetooth packet of the mobile phone 2 includes the indication information. In this case, the mobile phone 1 displays, in the highlighting manner, a link identifier corresponding to the notebook computer.

That the mobile phone 1 displays the link identifier corresponding to the notebook computer in the highlighting manner includes the following: The link identifier corresponding to the mobile phone 2 and the link identifier corresponding to the notebook computer are displayed before another link identifier on the Bluetooth scanning interface of the mobile phone 1; or the link identifier corresponding to the notebook computer on the Bluetooth scanning interface of the mobile phone 1 further includes a preset identifier; or the link identifier corresponding to the notebook computer on the Bluetooth scanning interface of the mobile phone 1 includes the preset identifier, and the link identifier corresponding to the notebook computer is displayed before the another link identifier; or the link identifier corresponding to the mobile phone 2 and the link identifier corresponding to the notebook computer are selected on the Bluetooth scanning interface of the mobile phone 1; or the link identifier corresponding to the mobile phone 2 and the link identifier corresponding to the notebook computer are displayed in a manner different from that of the another link identifier on the Bluetooth scanning interface of the mobile phone 1.

In a second implementation, the mobile phone 2 detects that a motion status of the mobile phone 2 changes under the preset condition, and the Bluetooth packet broadcast by the mobile phone 2 includes the indication information and the first account. The notebook computer is on a Bluetooth scanning interface, and the notebook computer may receive the Bluetooth packet broadcast by the mobile phone 2. The notebook computer determines that the Bluetooth packet of the mobile phone 2 includes the first account, the Bluetooth packet broadcast by the mobile phone 2 includes the indication information, the Bluetooth packet broadcast by the notebook computer includes indication information (second indication information), and the second indication information is used to indicate that a motion status of the notebook computer changes under the preset condition. The mobile phone 1 responds to the Bluetooth packet of the notebook computer, and the mobile phone 1 displays, in the highlighting manner, a link identifier corresponding to the notebook computer.

The displaying the link identifier corresponding to the notebook computer in the highlighting manner is the same as displaying the link identifier of the mobile phone 2 in the foregoing scenario 1. Details are not described herein again.

Therefore, when using the mobile phone 1 to share data with the notebook computer, the user can quickly find the link identifier corresponding to the notebook computer. The mobile phone 1 and the notebook computer may establish Bluetooth communication, so that the mobile phone 1 shares data with the notebook computer.

The following describes the technical solutions of embodiments of this application with reference to accompanying drawings.

Figure 2A:
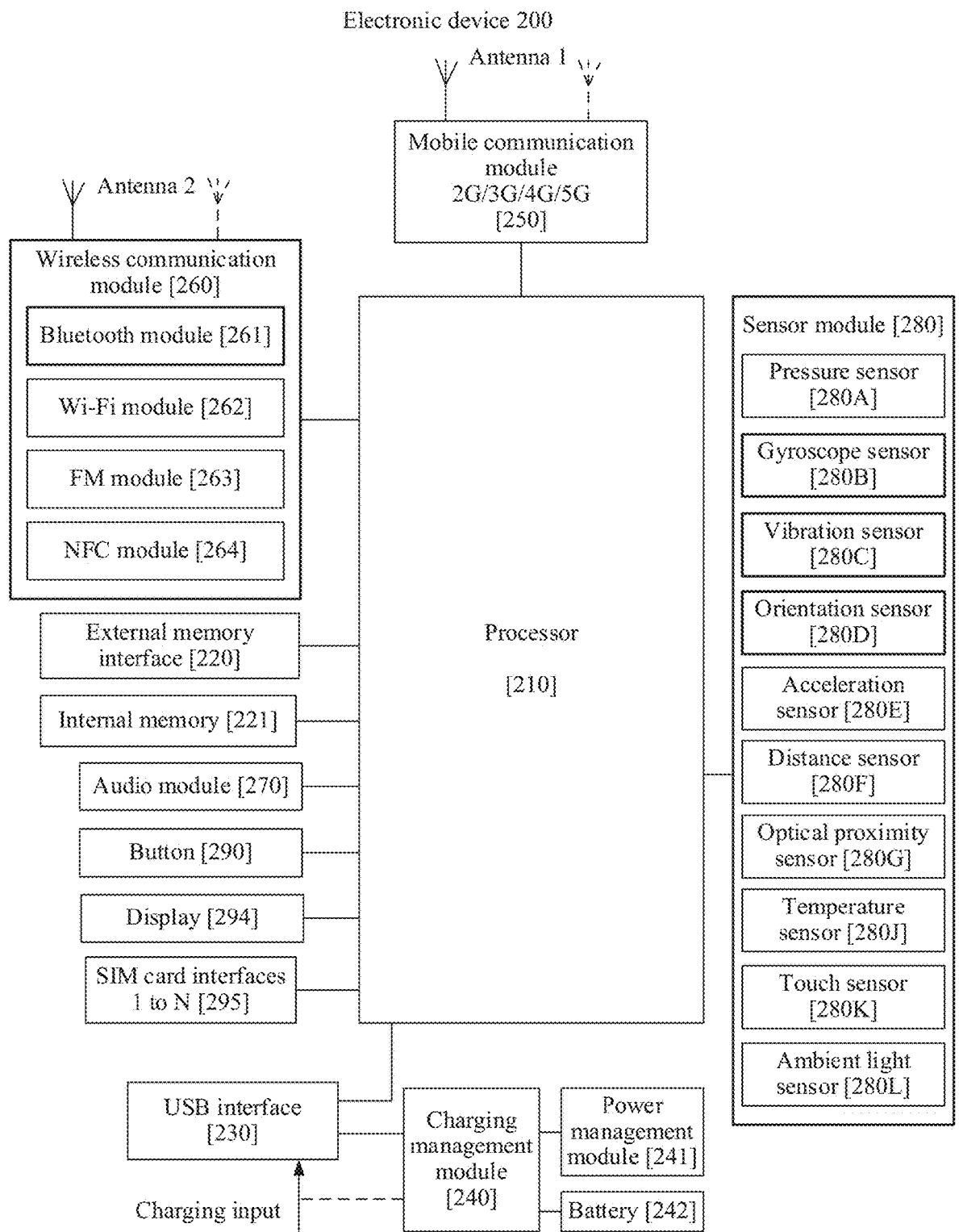
FIG. 2A is a schematic diagram of a structure of an electronic device according to an embodiment of this application.

FIG. 2A is a schematic diagram of a structure of an electronic device 200 according to an embodiment of this application. As shown in FIG. 2A, the electronic device 200 may include a processor 210, an external memory interface 220, an internal memory 221, a universal serial bus (universal serial bus, USB) interface 230, a charging management module 240, a power management module 241, a battery 242, an antenna 1, an antenna 2, a mobile communication module 250, a wireless communication module 260, an audio module 270, a sensor module 280, a button

290, a display 294, a subscriber identification module (subscriber identification module, SIM) card interface 295, and the like. The sensor module 280 may include a pressure sensor 280A, a gyroscope sensor 280B, a vibration sensor 280C, an orientation sensor 280D, an acceleration sensor 280E, a distance sensor 280F, an optical proximity sensor 280G, a temperature sensor 280J, a touch sensor 280K, an ambient light sensor 280L, and the like.

It may be understood that the structure shown in this embodiment of the present invention does not constitute a specific limitation on the electronic device 200. In some other embodiments of this application, the electronic device 200 may include more or fewer components than those shown in the figure, or combine some components, or split some components, or have different component arrangements. The components shown in the figure may be implemented by hardware, software, or a combination of software and hardware.

The processor 210 may include one or more processing units. For example, the processor 210 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be independent components, or may be integrated into one or more processors.

The controller may be a nerve center and a command center of the electronic device 200. The controller may generate an operation control signal based on an instruction operation code and a time sequence signal, to complete control of instruction reading and instruction execution.

A memory may be further disposed in the processor 210, and is configured to store instructions and data. In some embodiments, the memory in the processor 210 is a cache. The memory may store instructions or data just used or cyclically used by the processor 210. If the processor 210 needs to use the instructions or the data again, the processor 210 may directly invoke the instructions or the data from the memory. This avoids repeated access, reduces waiting time of the processor 210, and improves system efficiency.

In some embodiments, the processor 210 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

It may be understood that an interface connection relationship between the modules that is shown in this embodiment of the present invention is merely an example for description, and does not constitute a limitation on the structure of the electronic device 200. In some other embodiments of this application, the electronic device 200 may alternatively use an interface connection mode different from an interface connection mode in this embodiment, or a combination of a plurality of interface connection modes.

The external memory interface 220 may be configured to connect to an external storage card, for example, a Micro SD card, to extend a storage capability of the electronic device 200. The external storage card communicates with the processor 210 through the external memory interface 220, to implement a data storage function. For example, files such as music and videos are stored in the external storage card.

The internal memory 221 may be configured to store computer-executable program code, where the executable program code includes instructions. The processor 210 executes various function applications and data processing of the electronic device 200 by running the instructions stored in the internal memory 221. The internal memory 221 may include a program storage area and a data storage area. The program storage area may store an operating system, an application required by at least one function (for example, a voice playing function or an image playing function), and the like. The data storage area may store data (such as audio data and a phone book) created when the electronic device 200 is used, and the like. In addition, the internal memory 221 may include a high-speed random access memory, and may further include a nonvolatile memory, for example, at least one magnetic disk storage device, a flash memory device, or a universal flash storage (universal flash storage, UFS).

The charging management module 240 is configured to receive a charging input from a charger. The charger may be a wireless charger or a wired charger. The power management module 241 is configured to connect to the battery 242, the charging management module 240, and the processor 210. The power management module 241 receives an input from the battery 242 and/or the charging management module 240, and supplies power to the processor 210, the internal memory 221, the external memory, the display 294, the wireless communication module 260, a Bluetooth module 261, and the like.

A wireless communication function of the electronic device 200 may be implemented through the antenna 1, the antenna 2, the mobile communication module 250, the wireless communication module 260, the modem processor, the baseband processor, and the like.

The mobile communication module 250 can provide a solution, applied to the electronic device 200, to wireless communication including 2G, 3G, 4G, 5G, or the like. The mobile communication module 250 may include at least one filter, a switch, a power amplifier, a low noise amplifier (low noise amplifier, LNA), and the like. The mobile communication module 250 may receive an electromagnetic wave by using the antenna 1, perform processing such as filtering and amplification on the received electromagnetic wave, and transmit the electromagnetic wave to the modem processor for demodulation. The mobile communication module 250 may further amplify a signal modulated by the modem processor, and convert the signal into an electromagnetic wave by using the antenna 1 for radiation.

The wireless communication module 260 may provide a wireless communication solution applied to the electronic device 200 and including a wireless local area network (wireless local area network, WLAN) (for example, a wireless fidelity (Wireless Fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, and the like. The wireless communication module may include the Bluetooth module 261, a Wi-Fi module 262, an FM module 263, an NFC module 264, and the like. The wireless communication module 260 may be one or more devices integrating at least one communication processing module. The wireless communication module 260 receives an electromagnetic wave by using the antenna 2, performs frequency modulation and filtering on the electromagnetic wave signal, and sends the processed signal to the processor 210. The wireless communication module 260 may further receive a to-be-sent signal from the processor 210, perform frequency modulation and amplification on the to-be-sent signal, and convert the signal into an electromagnetic wave by using the antenna 2 for radiation.

The Bluetooth module 261 may support short-range wireless communication. In some embodiments, the Bluetooth module 261 may listen to a Bluetooth packet broadcast by a Bluetooth module of another electronic device. In some other embodiments, the Bluetooth module 261 may establish communication with the sensor module 280, to obtain data of the sensor module. If the data of the sensor indicates that a motion status of the electronic device 200 changes under a preset condition, the electronic device 200 may generate indication information based on the data of the sensor module, and a Bluetooth packet broadcast by the Bluetooth module 261 may include the indication information.

The electronic device 200 implements a display function by using the GPU, the display 294, the application processor, and the like. The GPU is a microprocessor for image processing, and is connected to the display 294 and the application processor. The GPU is configured to: perform mathematical and geometric computation, and render an image. The processor 210 may include one or more GPUs that execute program instructions to generate or change display information.

The display 294 is configured to display an image, a video, and the like. The display 294 includes a display panel. The display panel may use a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flexible light-emitting diode, FLED), a mini-LED, a micro-LED, a micro-OLED, a quantum dot light emitting diode (quantum dot light emitting diode, QLED), or the like. In some embodiments, the electronic device 200 may include one or N displays 294, where N is a positive integer greater than 1.

In some embodiments, when the electronic device 200 displays a Bluetooth scanning interface, the electronic device 200 may detect a Bluetooth packet broadcast by another electronic device, and the display 294 of the electronic device 200 may display a link identifier corresponding to the another electronic device.

The electronic device 200 may implement an audio function such as music playing and recording by using the audio module 270, the application processor, and the like.

The electronic device 200 may obtain sensor data by using each sensor in the sensor module 280, and determine the motion status of the electronic device based on the sensor data. In some embodiments, the sensor module 280 may establish a communication connection to the Bluetooth module 261, and send the sensor data to the Bluetooth module 261.

The pressure sensor 280A is configured to sense a pressure signal, and may convert the pressure signal into an electrical signal. In some embodiments, the pressure sensor 280A may be disposed on the display 294. There are many types of pressure sensors 280A such as a resistive pressure sensor, an inductive pressure sensor, and a capacitive pressure sensor. The capacitive pressure sensor may include at least two parallel plates made of conductive materials. Capacitance between electrodes changes when a force is applied to the pressure sensor 280A. The electronic device 200 determines pressure intensity based on the change of the capacitance. When a touch operation is performed on the display 294, the electronic device 200 detects intensity of the touch operation based on the pressure sensor 280A. The electronic device 200 may also calculate a touch location based on a detection signal of the pressure sensor 280A.

The gyroscope sensor 280B may be configured to determine a motion posture of the electronic device 200. In some embodiments, an angular velocity of the electronic device 200 around three axes (namely, x, y, and z axes) may be determined by using the gyroscope sensor 280B. The gyroscope sensor 280B may be used for image stabilization during photographing. In some embodiments, the gyroscope sensor may be configured to determine whether the electronic device 200 is flipped.

The vibration sensor 280C may be configured to determine the motion status of the electronic device 200. In some embodiments, the vibration sensor 280C may be used to determine whether the motion status of the electronic device 200 changes under the preset condition, for example, whether the electronic device 200 is in a "shake" motion state.

The orientation sensor 280D may be configured to sense a magnitude of an inertia force of the electronic device 200 in a direction and measure acceleration and gravity of the electronic device 200 in the direction. In some embodiments, the vibration sensor 280C may be used to determine whether the motion status of the electronic device 200 changes under the preset condition.

The acceleration sensor 280E may detect magnitudes of accelerations in various directions (usually on three axes) of the electronic device 200, and may detect a magnitude and a direction of the gravity when the electronic device 200 is still. The acceleration sensor 280E may be further configured to identify a posture of the electronic device, and is used in an application such as switching between a landscape mode and a portrait mode or a pedometer.

The distance sensor 280F is configured to measure a distance. The electronic device 200 may measure the distance through infrared or laser. In some embodiments, in a photographing scenario, the electronic device 200 may perform ranging by using the distance sensor 280F to implement fast focusing.

The optical proximity sensor 280G may include a light emitting diode (LED) and an optical detector, for example, a photodiode. The light emitting diode may be an infrared light emitting diode. The electronic device 200 emits infrared light by using the light emitting diode. The electronic device 200 detects infrared reflected light from a nearby object by using the photodiode. When detecting sufficient reflected light, the electronic device 200 may determine that there is an object near the electronic device 200. When detecting insufficient reflected light, the electronic device 200 may determine that there is no object near the electronic device 200. The electronic device 200 may detect, by using the optical proximity sensor 280G, that a user holds the electronic device 200 close to an ear to make a call, to automatically turn off a screen for power saving. The optical proximity sensor 280G may also be used for automatic screen unlocking and locking in a smart cover mode or a pocket mode.

The temperature sensor 280J is configured to detect a temperature. In some embodiments, the electronic device 200 executes a temperature processing policy by using the temperature detected by the temperature sensor 280J. For example, when the temperature reported by the temperature sensor 2803 exceeds a threshold, the electronic device 200 lowers performance of a processor located near the temperature sensor 280J, to reduce power consumption and implement thermal protection. In some other embodiments, when the temperature is less than another threshold, the electronic device 200 heats the battery 242, to avoid a case in which the electronic device 200 is shut down abnormally due to a low temperature. In some other embodiments, when the temperature is less than still another threshold, the electronic device 200 boosts an output voltage of the battery 242, to avoid an abnormal shutdown caused by a low temperature.

The touch sensor 280K is also referred to as a "touch panel". The touch sensor 280K may be disposed on the display 294. The touch sensor 280K and the display 294 form a touchscreen, which is also referred to as a "touchscreen". The touch sensor 280K is configured to detect a touch operation performed on or near the touch sensor 280K. The touch sensor may transfer the detected touch operation to the application processor to determine a type of the touch event. The display 294 may provide a visual output related to the touch operation. In some other embodiments, the touch sensor 280K may alternatively be disposed on a surface of the electronic device 200, or disposed in a position different from the display 294.

The ambient light sensor 280L is configured to sense ambient light luminance. The electronic device 200 may adaptively adjust luminance of the display 294 based on the sensed ambient light luminance. The ambient light sensor 280L may also be configured to automatically adjust white balance during photographing. The ambient light sensor 280L may also cooperate with the optical proximity sensor 280G to detect whether the electronic device 200 is in a pocket to prevent an accidental touch.

The button 290 includes a power button, a volume button, or the like. The button 290 may be a mechanical button, or may be a touch button. The electronic device 200 may receive a button input, and generate a button signal input related to a user setting and function control of the electronic device 200.

The SIM card interface 295 is configured to connect to a SIM card. The SIM card may be inserted into the SIM card interface 295 or removed from the SIM card interface 295, to implement contact with or separation from the electronic device 200. The electronic device 200 may support one or N SIM card interfaces, where N is a positive integer greater than 1. The SIM card interface 295 may support a nano-SIM card, a micro-SIM card, a SIM card, and the like. A plurality of cards may be simultaneously inserted into a same SIM card interface 295. The plurality of cards may be of a same type or different types. The SIM card interface 295 may also be compatible with different types of SIM cards. The SIM card interface 295 may also be compatible with the external storage card. The electronic device 200 interacts with a network by using the SIM card, to implement a call function, a data communication function, and the like.

A software system of the electronic device 200 may use a layered architecture, an event-driven architecture, a microkernel architecture, a microservice architecture, or a cloud architecture. In embodiments of the present invention, an Android system of a layered architecture is used as an example to illustrate a software structure of the electronic device 200.

Figure 2B:
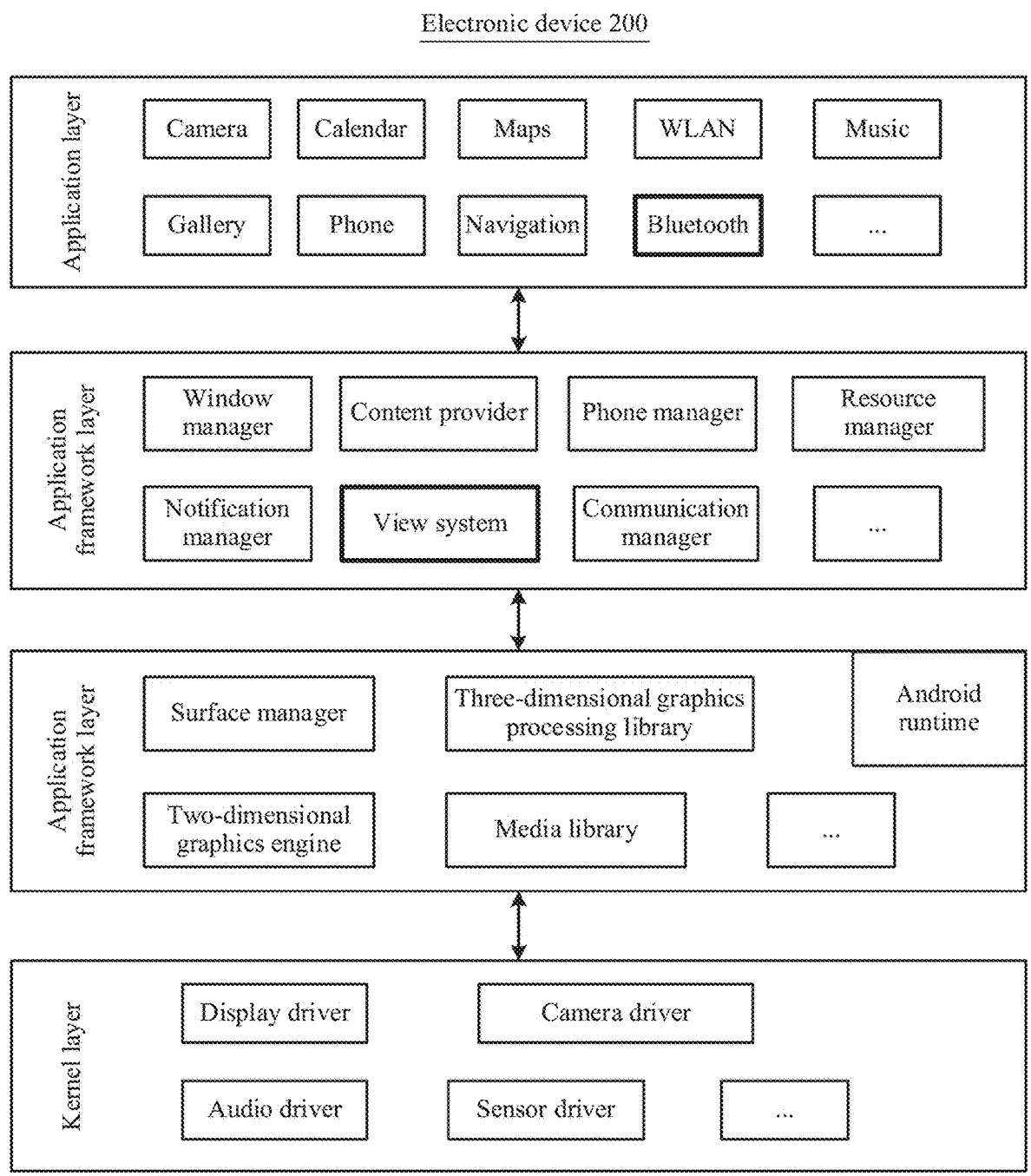
FIG. 2B is a schematic diagram of a software structure of an electronic device according to an embodiment of this application.

FIG. 2B is a block diagram of a software structure of the electronic device 200 according to an embodiment of the present invention.

In a layered architecture, software is divided into several layers, and each layer has a clear role and task. The layers communicate with each other through a software interface. In some embodiments, the Android system is divided into four layers: an application layer, an application framework layer, an Android runtime (Android runtime) and system library, and a kernel layer from top to bottom.

The application layer may include a series of application packages.

As shown in FIG. 2B, the application package may include applications such as Camera, Gallery, Calendar, Phone, Maps, Navigation, WLAN, Bluetooth. Music, Videos, and Messages.

The application framework layer provides an application programming interface (application programming interface, API) and a programming framework for an application at the application layer. The application framework layer includes some predefined functions.

As shown in FIG. 2B, the application framework layer may include a window manager, a content provider, a view system, a phone manager, a resource manager, a notification manager, and the like.

The window manager is configured to manage a window program. The window manager may obtain a size of the display, determine whether there is a status bar, perform screen locking, take a screenshot, and the like.

The content provider is configured to: store and obtain data, and enable the data to be accessed by an application. The data may include a video, an image, audio, calls that are made and answered, browsing history and bookmarks, an address book, and the like.

The view system includes visual controls such as a control for displaying a text and a control for displaying an image. The view system may be configured to construct an application. A display interface may include one or more views. For example, a Bluetooth scanning interface including a plurality of link identifiers may display a link identifier corresponding to an electronic device 2, and display a link identifier corresponding to an electronic device 3.

The phone manager is configured to provide a communication function of the electronic device 200, for example, management of a call status (including answering, declining, or the like).

The resource manager provides various resources such as a localized character string, an icon, an image, a layout file, and a video file for an application.

The notification manager enables an application to display notification information in a status bar, and may be configured to convey a notification message. The notification manager may automatically disappear after a short pause without user interaction. For example, the notification manager is configured to notify download completion, a message reminder, a Bluetooth pairing success reminder, and the like. The notification manager may alternatively be a notification that appears in a top status bar of the system in a form of a graph or a scroll bar text, for example, a notification of an application that is run on a background, or may be a notification that appears on the screen in a form of a dialog window. For example, text information is displayed in the status bar, an announcement is given, the electronic device vibrates, or the indicator light blinks.

The Android runtime includes a kernel library and a virtual machine. The Android runtime is responsible for scheduling and management of the Android system.

The kernel library includes two parts: a function that needs to be invoked in java language, and a kernel library of Android.

The application layer and the application framework layer run on the virtual machine. The virtual machine executes java files of the application layer and the application framework layer as binary files. The virtual machine is configured to implement functions such as object lifecycle management, stack management, thread management, security and exception management, and garbage collection.

The system library may include a plurality of functional modules, for example, a surface manager (surface manager), a media library (Media Library), a three-dimensional graphics processing library (for example. OpenGL ES), and a 2D graphics engine (for example, SGL).

The surface manager is configured to manage a display subsystem and provide fusion of 2D and 3D layers for a plurality of applications.

The media library supports playback and recording in a plurality of commonly used audio and video formats, and static image files. The media library may support a plurality of audio and video coding formats such as MPEG-4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

All of the following embodiments may be implemented in an electronic device having the foregoing hardware structure.

Figure 3A:
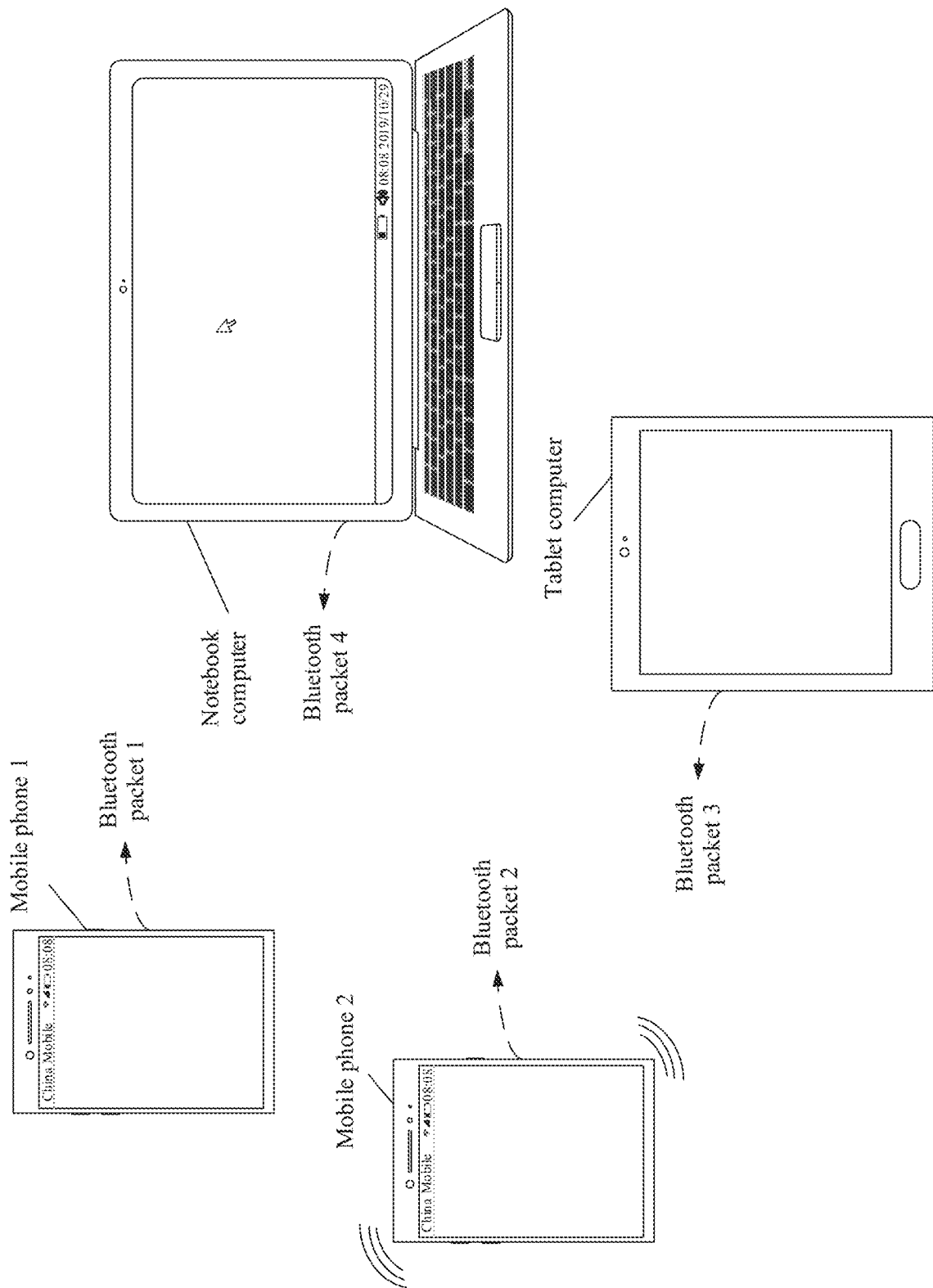
FIG. 3A is a schematic diagram of an application scenario according to an embodiment of this application.

FIG. 3A is a schematic diagram of a scenario to which the method for displaying a Bluetooth device identifier is applied according to an embodiment of this application. In this embodiment of this application, an example in which a Bluetooth communication range includes a first electronic device, a second electronic device, a third electronic device, and a fourth electronic device 4 is used. Each electronic device is provided with a Bluetooth module. It is assumed that the first electronic device is a mobile phone 2, the second electronic device is a tablet computer, the third electronic device is a mobile phone 1, and the fourth electronic device is a notebook computer.

The mobile phone 1, the mobile phone 2, the notebook computer, and the tablet computer may all broadcast a Bluetooth packet, may receive Bluetooth packets broadcast by each other, and display a Bluetooth scanning interface. In this embodiment of this application, that a user of the mobile phone 1 wants to use the mobile phone 1 to share data with the mobile phone 2 is used as an example. That is, Bluetooth communication is established between the mobile phone 1 and the mobile phone 2.

Figure 3B:
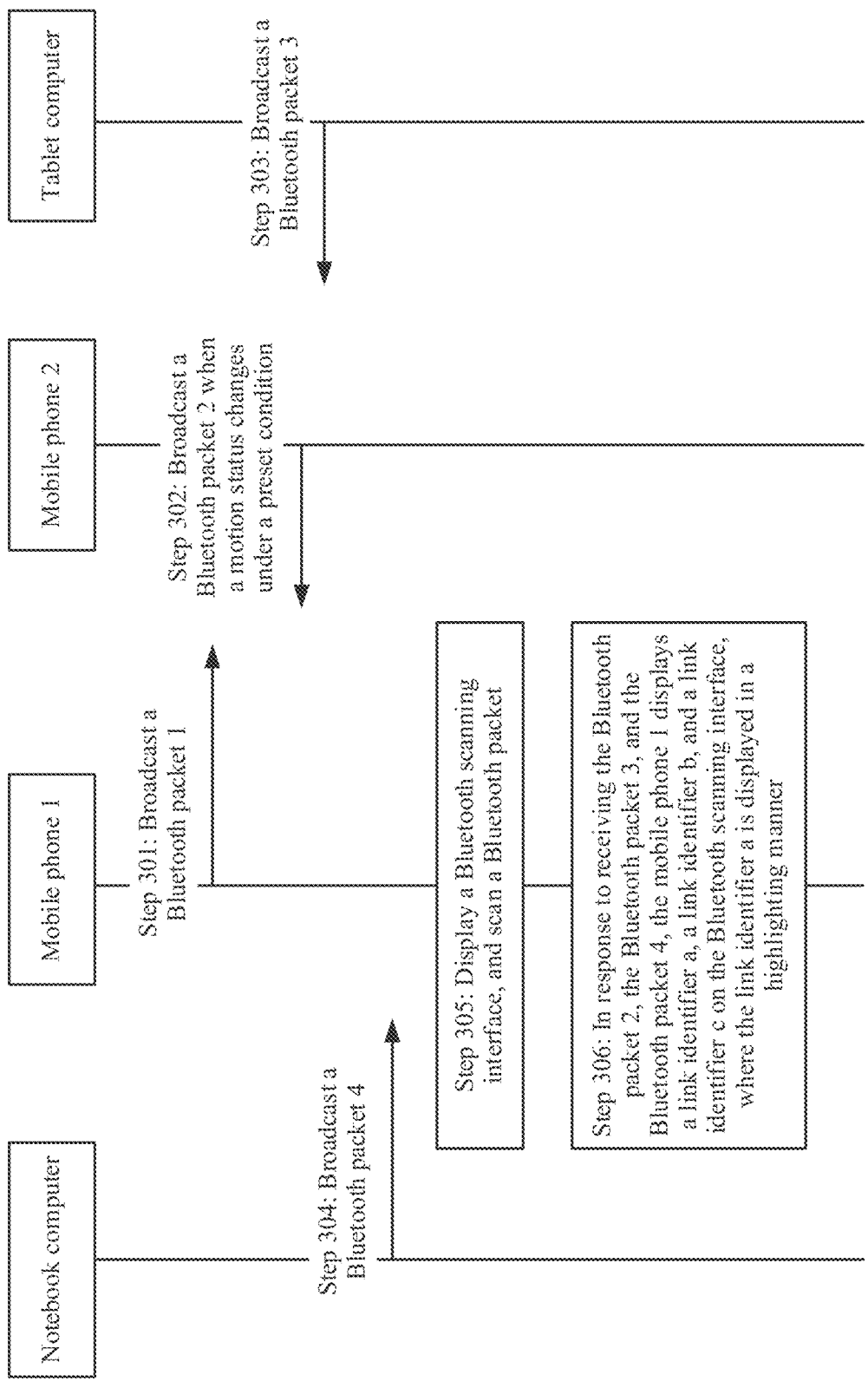
FIG. 3B is a flowchart of a method for displaying a Bluetooth device identifier according to an embodiment of this application.

Specifically, FIG. 3B is a flowchart of a method for displaying a Bluetooth device identifier according to an embodiment of this application. The method may include step 301 to step 306. In this embodiment of this application, the method in this embodiment of this application is described by using an example in which a status change of a mobile phone is that a motion status of the mobile phone changes under a preset condition.

Step 301: The mobile phone 1 broadcasts a Bluetooth packet 1.

The Bluetooth packet 1 may include information such as an access address of the mobile phone 1.

In some embodiments, the Bluetooth packet 1 may further include a Bluetooth name of the mobile phone 1. For example, the Bluetooth name of the mobile phone 1 is "A's shouji1".

Step 302: The mobile phone 2 broadcasts a Bluetooth packet 2 when a motion status of the mobile phone 2 changes under the preset condition.

The Bluetooth packet 2 may include indication information 1 and an access address of the mobile phone 2. The indication information 1 is used to indicate that the motion status of the mobile phone 2 changes under the preset condition.

In some embodiments, the Bluetooth packet 2 may further include a Bluetooth name of the mobile phone 2. For example, the Bluetooth name of the mobile phone 2 is "Linda's shouji2".

It may be understood that if the status of the mobile phone 2 changes under the preset condition, the mobile phone 2 broadcasts the Bluetooth packet 2 including the indication information 1. For example, a preset condition for broadcasting the Bluetooth packet 2 by the mobile phone 2 is that the mobile phone 2 is in a shake state. When the mobile phone 2 is in the shake state, the mobile phone 2 broadcasts the Bluetooth packet 2. For another example, a preset condition for broadcasting the Bluetooth packet 2 by the mobile phone 2 is that the mobile phone 2 is in a flip state. When the mobile phone 2 is in the flip state, the mobile phone 2 broadcasts the Bluetooth packet 2.

In some embodiments, a data format of the Bluetooth packet 2 is shown in the following Table 1. When the mobile phone 2 determines that the motion status of the mobile phone 2 changes under the preset condition, a reserved bit in the Bluetooth packet is set to an indication location, and the indication location is used to store the indication information 1.

TABLE 1

| Data format of the Bluetooth packet 2 | | | | | | | |
| --- | --- | --- | --- | --- | --- | --- | --- |
| Preamble sequence | Access address | Packet type | Reserved bit | Transmitter address | Receiver address | Payload | Parity bit |

For example, if the mobile phone 2 detects that the motion status of the mobile phone 2 changes under the preset condition, the mobile phone 2 generates the indication information 1, and stores the indication information 1 in the reserved bit in the Bluetooth packet. In this way, another device that receives the Bluetooth packet 2 may identify, based on the reserved bit in the data format of the Bluetooth packet 2, that the Bluetooth packet includes the indication information 1.

For example, if information stored in the reserved bit in the Bluetooth packet 2 broadcast by the mobile phone 2 is "motion is null", it indicates that the Bluetooth packet 2 does not include the indication information 1. If the information stored in the reserved bit in the Bluetooth packet 2 broadcast by the mobile phone 2 is "motion is x", it indicates that the Bluetooth packet 2 includes the indication information 1. In other words, if the mobile phone 2 detects that the motion status of the mobile phone 2 changes under the preset condition, the mobile phone 2 generates "motion is x" in response to the fact that the motion status of the mobile phone 2 changes under the preset condition, and stores "motion is x" in the reserved bit in the Bluetooth packet 2. In this way, the Bluetooth packet includes the indication information 1.

It may be understood that, when the mobile phone 1 broadcasts the Bluetooth packet 1, if the mobile phone 1 does not detect that a motion status of the mobile phone 1 changes under the preset condition, information stored by the mobile phone 1 in a reserved bit in the Bluetooth packet 1 is "motion is null". That is, the Bluetooth packet does not include the indication information 1.

Step 303: The tablet computer broadcasts a Bluetooth packet 3.

The Bluetooth packet 3 may include information such as an access address of the tablet computer.

In some embodiments, the Bluetooth packet 3 may further include a Bluetooth name of the tablet computer. For example, the Bluetooth name of the tablet computer is "cay's pad Pro".

Step 304: The notebook computer broadcasts a Bluetooth packet 4.

The Bluetooth packet 4 may include information such as an access address of the notebook computer.

In some embodiments, the Bluetooth packet 4 may further include a Bluetooth name of the notebook computer. For example, the Bluetooth name of the notebook computer is "Helen's matebook".

It may be understood that because the motion status of the mobile phone 1 does not change under the preset condition, the Bluetooth packet 1 broadcast by the mobile phone 1 does not include the indication information 1. If a motion status of the tablet computer does not change under the preset condition, the Bluetooth packet 3 broadcast by the tablet computer does not include the indication information 1. If a motion status of the notebook computer does not change under the preset condition, the Bluetooth packet 4 broadcast by the notebook computer does not include the indication information 1.

It should be noted that the Bluetooth packet 1, the Bluetooth packet 3, and the Bluetooth packet 4 are second Bluetooth packets, the Bluetooth packet 2 is a first Bluetooth packet, and the indication information 1 is first indication information.

For example, the motion status under the preset condition may be that the electronic device is in a "shake" motion state. For example, if the mobile phone 2 is in the "shake" motion state, the Bluetooth packet broadcast by the mobile phone 2 includes the indication information 1, and the indication information 1 is used to indicate that the mobile phone 2 is in the "shake" motion state.

An orientation sensor in the mobile phone 2 may detect a change of orientation information of the mobile phone 2, and a processor in the mobile phone 2 determines, based on data of the orientation sensor, whether the mobile phone 2 is in the "shake" state. Alternatively, a gyroscope sensor and a vibration sensor in the mobile phone 2 detect a change of orientation information of the mobile phone and a change of a vibration status of the mobile phone, and a processor in the mobile phone 2 determines, based on data of the gyroscope sensor and data of the vibration sensor, whether the mobile phone 2 is in the "shake" state.

For another example, the motion status under the preset condition is that the electronic device is in a "flip" motion state. For example, if the mobile phone 2 is in the "flip" motion state, the Bluetooth packet broadcast by the mobile phone 2 may include the indication information 1, and the indication information 1 is used to indicate that the mobile phone 2 is in the "flip" motion state.

The gyroscope sensor in the mobile phone 2 may detect a motion gesture of the mobile phone 2, and the processor in the mobile phone 2 may determine, based on data of the gyroscope sensor, whether the mobile phone 2 is in the "flip" motion state.

It should be noted that the mobile phone 2 includes a plurality of types of sensors, for example, an acceleration sensor, a distance sensor, an optical proximity sensor, a temperature sensor, a touch sensor, and an ambient light sensor. In a specific implementation, other status data may also be carried in the Bluetooth packet. For example, the distance sensor may detect a distance between an earpiece position of the mobile phone 2 and another object. Whether the earpiece position of the mobile phone 2 is blocked may be used as indication information, and whether the earpiece position of the mobile phone 2 is blocked is determined based on data of the distance sensor. If the earpiece position of the mobile phone 2 is blocked, the Bluetooth packet broadcast by the mobile phone 2 includes the indication information. If the earpiece position of the mobile phone 2 is not blocked, the Bluetooth packet broadcast by the mobile phone 2 does not include the indication information. In addition, a status of the mobile phone 2 indicated by the temperature sensor, the ambient light sensor, the acceleration sensor, and the like may also be used as indication information. Details are not described herein.

It can be learned that when the electronic device is in a Bluetooth-enabled state, each electronic device may broadcast a Bluetooth packet. However, data of Bluetooth packets broadcast by electronic devices is different. For example, the Bluetooth packet broadcast by the mobile phone 2 includes the indication information 1, and none of the Bluetooth packets broadcast by the mobile phone 1, the notebook computer, and the tablet computer includes the indication information 1.

In some implementations, because the motion status of the mobile phone 2 changes under the preset condition, the Bluetooth packet broadcast by the mobile phone 2 includes the indication information 1. In addition, the mobile phone 2 may always broadcast the Bluetooth packet (the Bluetooth packet including the indication information 1) within preset duration (second preset duration). For example, if the motion status that meets the preset condition is "shake", and the Bluetooth packet broadcast by the mobile phone 2 includes the indication information 1, all Bluetooth packets broadcast by the mobile phone 2 within 10 seconds include the first indication information. The second preset duration may be 5 seconds, 10 seconds, 15 seconds, or the like. This is not specifically limited.

Step 305: The mobile phone 1 displays a Bluetooth scanning interface, and scans a Bluetooth packet.

Figure 4:
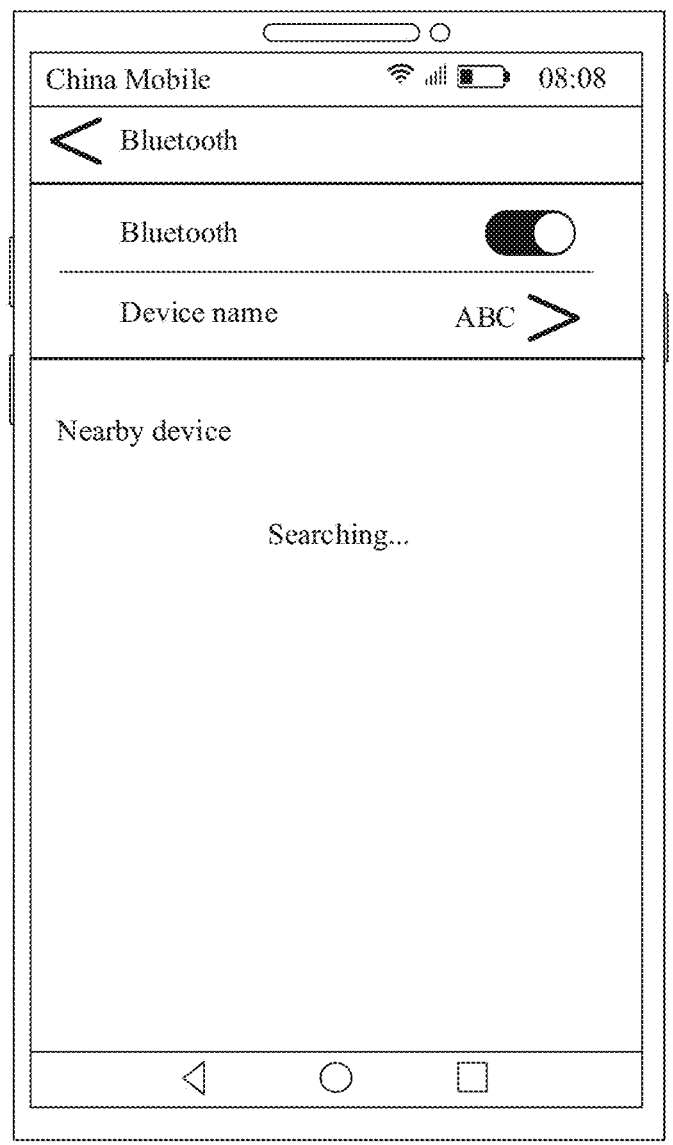
FIG. 4 is a schematic diagram of displaying a Bluetooth scanning interface according to an embodiment of this application.

It may be understood that, when the mobile phone 1 performs Bluetooth communication with another electronic device, after scanning a Bluetooth packet of the electronic device, the mobile phone 1 may establish a Bluetooth connection to the electronic device in response to a selection operation performed by the user on a link identifier corresponding to the electronic device. FIG. 4 shows the Bluetooth scanning interface displayed on the mobile phone 1. As shown in FIG. 4, the Bluetooth scanning interface of the mobile phone 1 displays content indicating that the mobile phone 1 is scanning a Bluetooth packet.

It should be noted that, after the mobile phone 1 displays the Bluetooth scanning interface, Bluetooth of the mobile phone 1 is in an enabled state, and the mobile phone 1 may broadcast a Bluetooth packet or may scan a Bluetooth packet. In other words, step 301 and step 305 may be steps performed after the mobile phone 1 displays the Bluetooth scanning interface, and step 301 and step 305 may be performed concurrently. In other words, step 301 may be: The mobile phone 1 displays a Bluetooth scanning interface, broadcasts a Bluetooth packet 1, and scans a Bluetooth packet.

Figure 5:
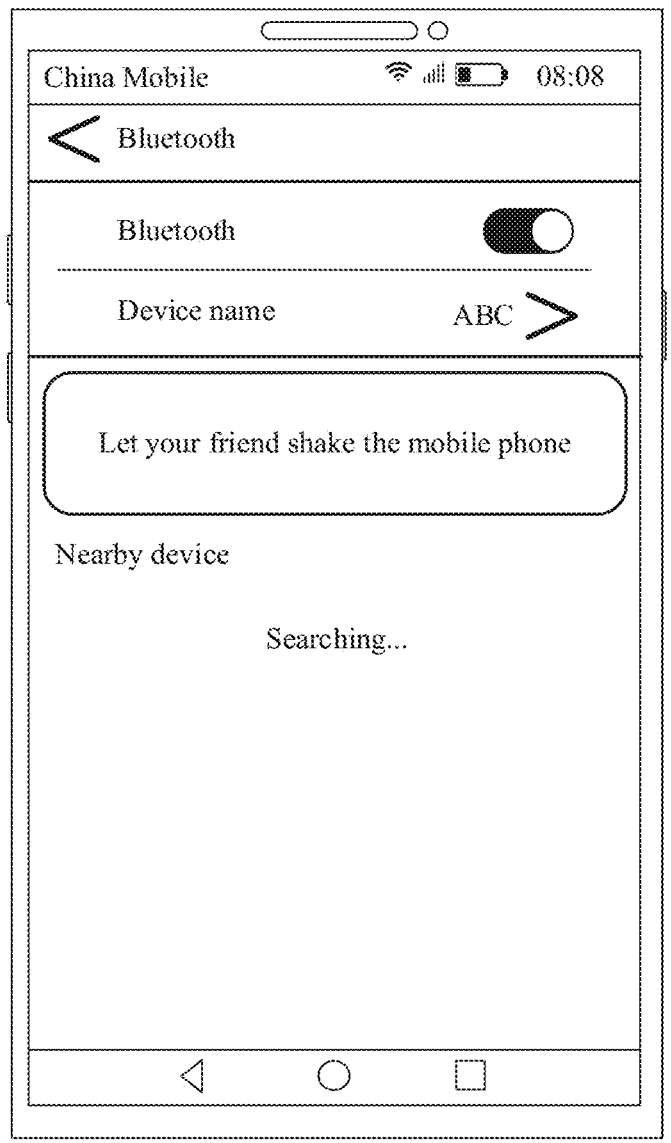
FIG. 5 is a schematic diagram of displaying another Bluetooth scanning interface according to an embodiment of this application.

In some implementations, the Bluetooth scanning interface of the mobile phone 1 may further display motion prompt information. The motion prompt information is used to notify the user of the motion status under the preset condition. As shown in FIG. 5, the motion prompt information is "Let your friend shake the mobile phone". When an operation is performed on the electronic device based on the prompt information on the Bluetooth scanning interface of the mobile phone 1, a Bluetooth packet broadcast by the electronic device may include the indication information 1. In other words, if the mobile phone 2 is shaken based on the prompt information on the Bluetooth scanning interface of the mobile phone 1, the mobile phone 2 broadcasts the Bluetooth packet 2 including the indication information 1.

Step 306: In response to receiving the Bluetooth packet 2, the Bluetooth packet 3, and the Bluetooth packet 4, the mobile phone 1 displays a link identifier a, a link identifier b, and a link identifier c on the Bluetooth scanning interface. The link identifier a is displayed in a highlighting manner.

The link identifier a corresponds to the mobile phone 2, the link identifier b corresponds to the tablet computer, and the link identifier c corresponds to the tablet computer.

In some implementations, the mobile phone 1 receives a Bluetooth packet, and may identify information included in a reserved bit in the Bluetooth packet. In this way, the mobile phone 1 may determine, based on the information in the reserved bit, whether the Bluetooth packet includes the indication information 1.

For example, if the mobile phone 1 identifies that information in the reserved bit in the Bluetooth packet 2 is "motion is x", the mobile phone 1 determines that the Bluetooth packet 2 includes the indication information 1. If the mobile phone 1 identifies that information in the reserved bit in the Bluetooth packet 3 is "motion is null", the mobile phone 1 determines that the Bluetooth packet 3 does not include the indication information 1.

It may be understood that if the indication information 1 indicates that the motion status of the electronic device that sends the Bluetooth packet changes under the preset condition, the indication information 1 indicates the electronic device that receives the Bluetooth packet to display, in the highlighting manner, a link identifier corresponding to the Bluetooth packet.

For example, the mobile phone 1 receives the Bluetooth packet 2, and the mobile phone 1 identifies the Bluetooth packet 2, and identifies that the information in the reserved bit in the Bluetooth packet is "motion is x". In this case, the mobile phone 1 responds to that the information in the reserved bit in the Bluetooth packet 2 is "motion is x", and the mobile phone 1 may determine that the motion status of the mobile phone 2 that broadcasts the Bluetooth packet 2 changes under the preset condition. In this case, the mobile phone 1 displays the link identifier corresponding to the Bluetooth packet 2 in the highlighting manner.

It may be understood that the Bluetooth packet of the mobile phone 2 includes the indication information 1. In response to the fact that the Bluetooth packet includes the indication information 1, the mobile phone 1 displays the link identifier a in the highlighting manner. If the user of the mobile phone 1 wants to control the mobile phone 1 to establish a Bluetooth connection to the mobile phone 2, the mobile phone 1 displays, in the highlighting manner, the link identifier a corresponding to the mobile phone 2. Therefore, when viewing the Bluetooth scanning interface of the mobile phone 1, the user can quickly find the link identifier a, so that the mobile phone 1 can establish Bluetooth communication with the mobile phone 2, to improve user experience.

In some implementations, that the mobile phone 1 displays the link identifier a in the highlighting manner on the Bluetooth scanning interface specifically includes: The link identifier corresponding to the mobile phone 2 is displayed before other link identifiers (for example, the link identifier b and the link identifier c) on the Bluetooth scanning interface of the mobile phone 1. Alternatively, the link identifier a on the Bluetooth scanning interface of the mobile phone 1 is selected. Alternatively, the link identifier a is displayed in a manner different from that of another link identifier on the Bluetooth scanning interface of the mobile phone 1. Alternatively, on the Bluetooth scanning interface of the mobile phone 1, the link identifier a corresponding to the mobile phone 2 corresponds to a preset identifier, and the link identifier a is displayed before another link identifier.

It may be understood that, displaying the link identifier a in the highlighting manner is to ensure that a display manner of the link identifier a is different from that of another link identifier. In this way, when viewing the Bluetooth scanning interface of the mobile phone 1, the user can quickly find the link identifier a corresponding to the mobile phone 2.

The mobile phone 1 receives the Bluetooth packet 2, and identifies a data format of the Bluetooth packet 2. In response to the fact that the Bluetooth packet 2 includes the indication information 1, the mobile phone 1 displays, in the highlighting manner, the link identifier corresponding to the mobile phone 2. It should be noted that different devices may have different highlighting manners. For example, highlighting may be different font formats, or may be different font sizes.

Figure 6A:
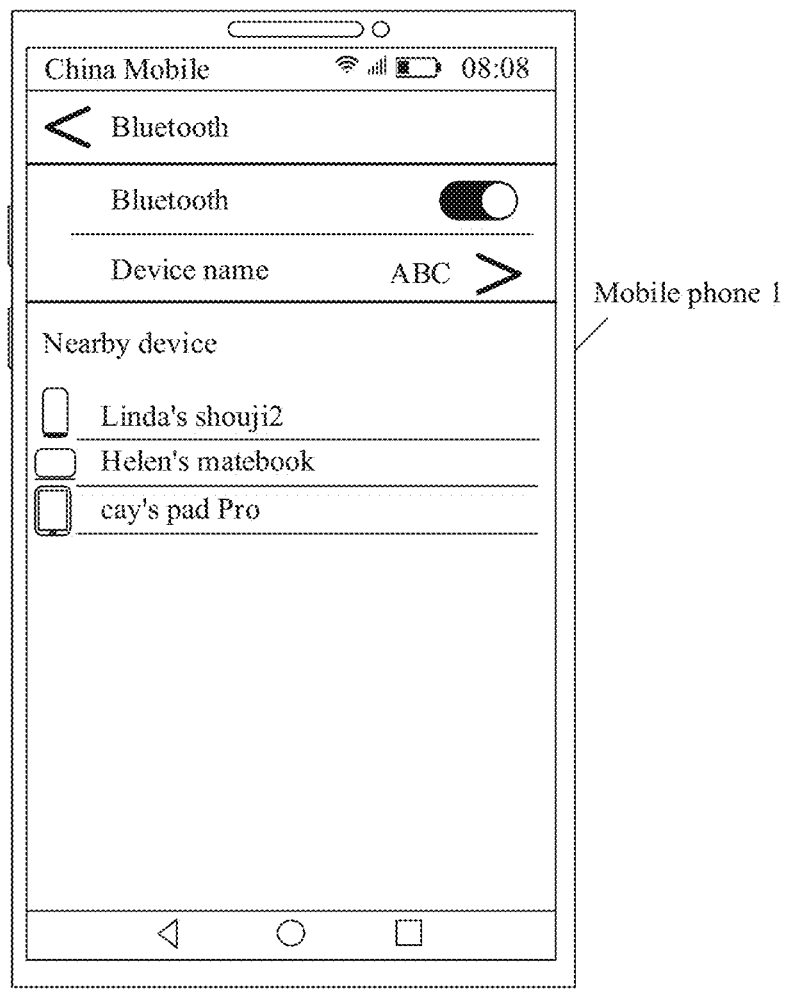
FIG. 6A is a schematic diagram of displaying another Bluetooth scanning interface according to an embodiment of this application.
Figure 6B:
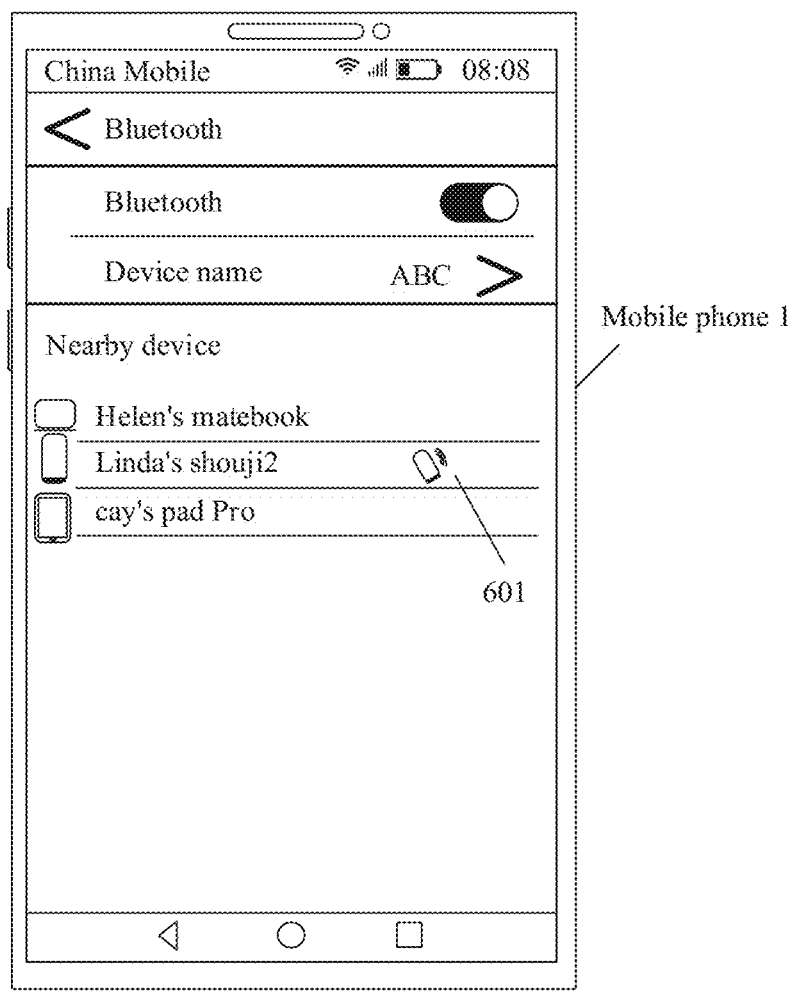
FIG. 6B is a schematic diagram of displaying another Bluetooth scanning interface according to an embodiment of this application.
Figure 6C:
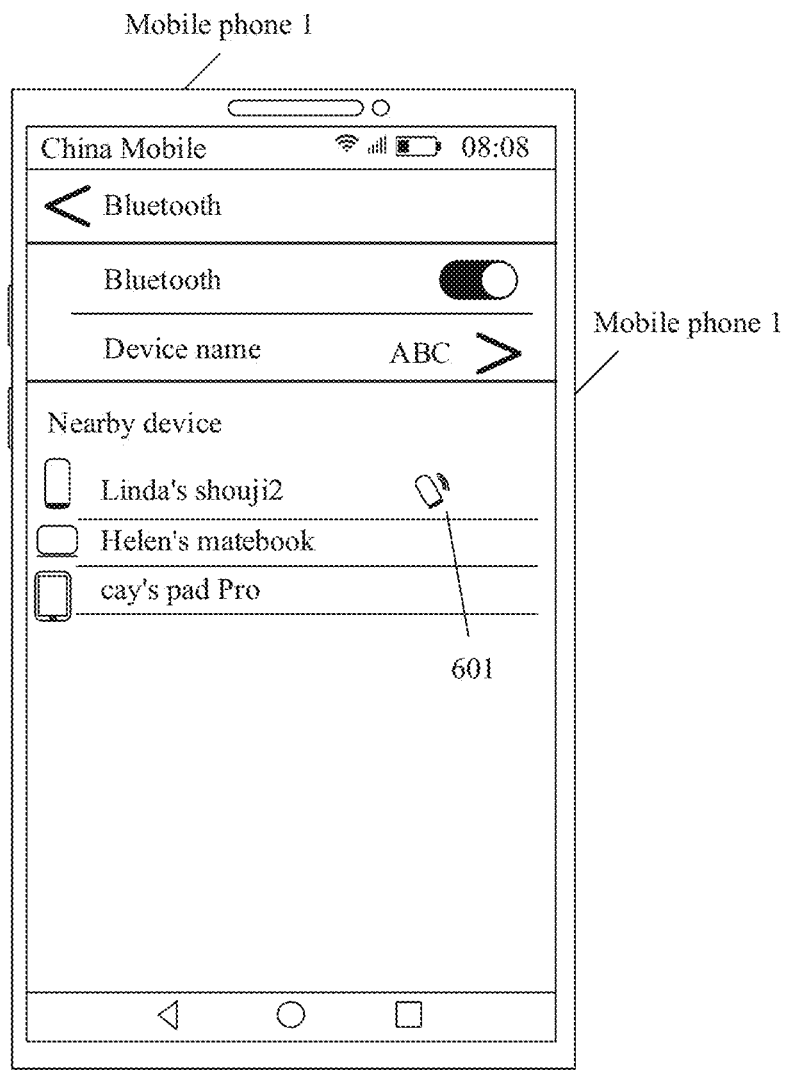
FIG. 6C is a schematic diagram of displaying another Bluetooth scanning interface according to an embodiment of this application.
Figure 6D:
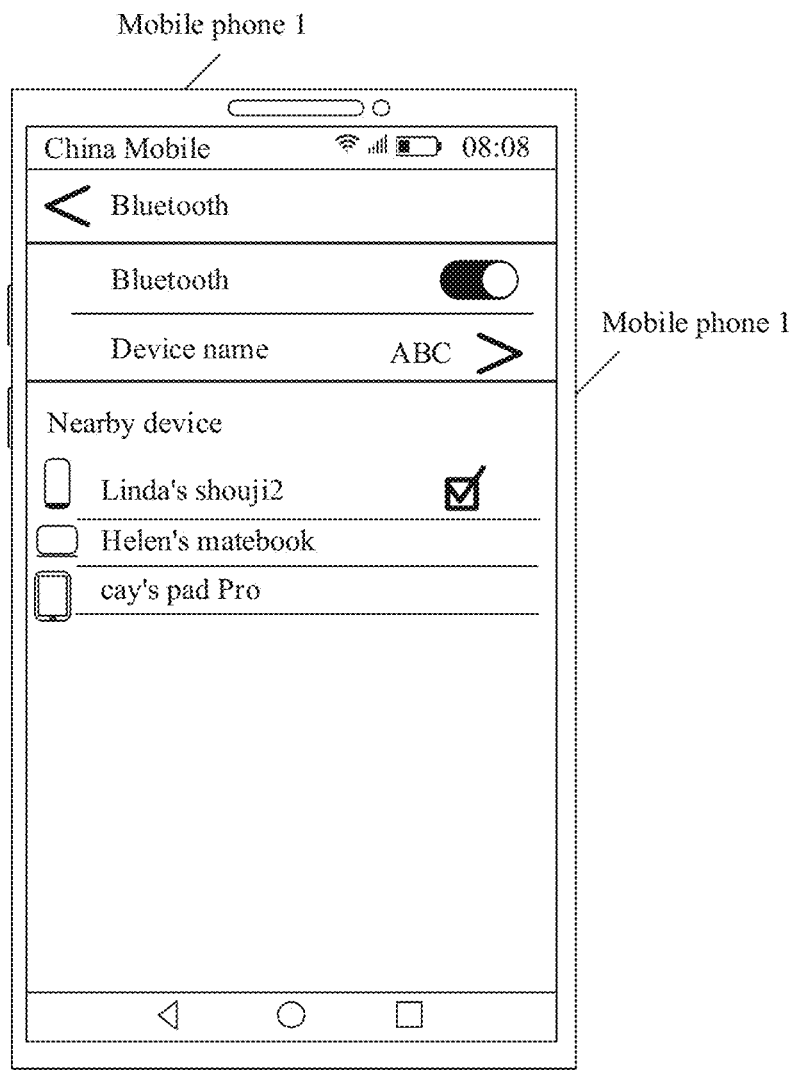
FIG. 6D is a schematic diagram of displaying another Bluetooth scanning interface according to an embodiment of this application.

For example, the link identifier a corresponding to the mobile phone 2 is "Linda's shouji2", the link identifier b corresponding to the tablet computer is "cay's pad Pro", and the link identifier c corresponding to the notebook computer is "Helen's matebook". As shown in FIG. 6A, the Bluetooth scanning interface of the mobile phone 1 includes the link identifier a (Linda's shouji2), the link identifier b (Helen's matebook), and the link identifier c (cay's pad Pro). The link identifier a is located before other link identifiers. As shown in FIG. 6B, the Bluetooth scanning interface of the mobile phone 1 includes Linda's shouji2, Helen's matebook, and cay's pad Pro. The link identifier a is further corresponding to a preset identifier 601. As shown in FIG. 6C, the Bluetooth scanning interface of the mobile phone 1 includes Linda's shouji2, Helen's matebook, and cay's pad Pro. The link identifier a is located before other link identifiers, and the link identifier a is further corresponding to the preset identifier 601. As shown in FIG. 6D, the Bluetooth scanning interface of the mobile phone 1 includes Linda's shouji2, Helen's matebook, and cay's pad Pro. The link identifier a is selected.

Figure 6E:
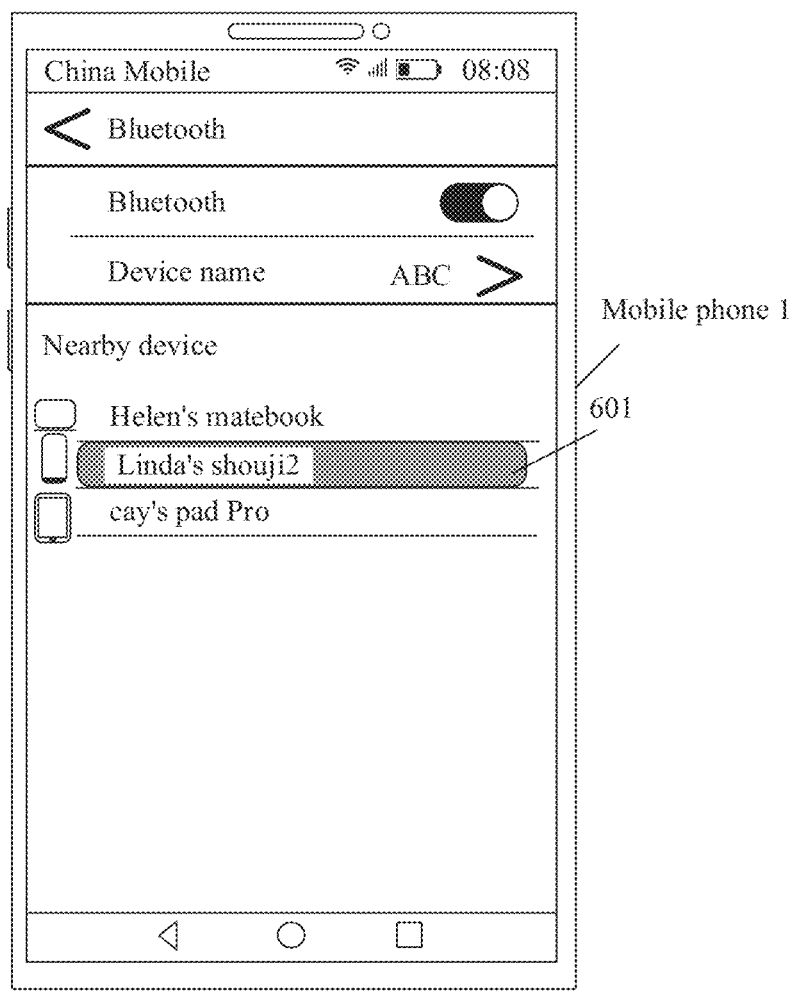
FIG. 6E is a schematic diagram of displaying another Bluetooth scanning interface according to an embodiment of this application.

It may be understood that the Bluetooth scanning interface of the mobile phone 1 shown in FIG. 6B includes the preset identifier 601. The preset identifier 601 may also be that a display area of the link identifier a is in another color, as shown in FIG. 6E. The Bluetooth scanning interface of the mobile phone 1 includes Linda's shouji2, Helen's matebook, and cay's pad Pro. The link identifier a is corresponding to the preset identifier 601. That is, a color of a display box in which the link identifier a is located is different from a color of a display box in which another link identifier is located.

If another electronic device in the Bluetooth communication range of the mobile phone 1 enables Bluetooth and broadcasts a Bluetooth packet, after the mobile phone 1 receives the Bluetooth packet broadcast by the another electronic device, in response to receiving the Bluetooth packet of the electronic device, the mobile phone 1 may update the Bluetooth scanning interface, and the mobile phone 1 may update a quantity and a sequence of link identifiers on the Bluetooth scanning interface.

If the mobile phone 1 updates the link identifiers on the Bluetooth scanning interface, a display sequence of the link identifiers may be changed. If the mobile phone 1 has not received a selection operation performed by the user on the link identifier in this case, the mobile phone 1 updates the link identifiers on the Bluetooth scanning interface, so that the user needs to re-confirm a location of a to-be-connected link identifier. This increases difficulty for the user to search for a first link identifier corresponding to the mobile phone 2.

In some implementations, after receiving the Bluetooth packet broadcast by the mobile phone 2, the mobile phone 1 responds to that the Bluetooth packet of the mobile phone 2 includes the first indication information. The mobile phone 2 may keep, within first preset duration starting from a moment when receiving the Bluetooth packet of the mobile phone 2, a display manner of the link identifier a corresponding to the mobile phone 2 on the Bluetooth scanning interface of the mobile phone 1 unchanged.

For example, after the mobile phone 1 receives that the Bluetooth packet of the mobile phone 2 includes the first indication information, and before the link identifier a is displayed before another link identifier on the Bluetooth scanning interface of the mobile phone 1, the mobile phone 1 keeps the display manner of the first link identifier on the Bluetooth scanning interface unchanged within the first preset duration. The first preset duration may be 5 seconds, 10 seconds, 15 seconds, or the like.

Compared with a conventional Bluetooth communication connection, in the method for displaying a Bluetooth device identifier in this embodiment of this application, when viewing the Bluetooth scanning interface on the mobile phone 1, the user can quickly find a link identifier corresponding to an electronic device to which the user wants to connect. The mobile phone 1 displays the link identifier a in the highlighting manner, to reduce difficulty for the user to search for an identifier of a Bluetooth device for Bluetooth pairing. In this way, user experience is improved.

It may be understood that because the mobile phone 2 has a small size and is suitable for the user to hold, the motion status of the mobile phone 2 is easily changed. If the electronic device to which the user wants to connect is a notebook computer, the user may log in to a same account (the first account) on the notebook computer and the mobile phone 2, so that the mobile phone 1 displays, in the highlighting manner, the link identifier c corresponding to the notebook computer.

Figure 7:
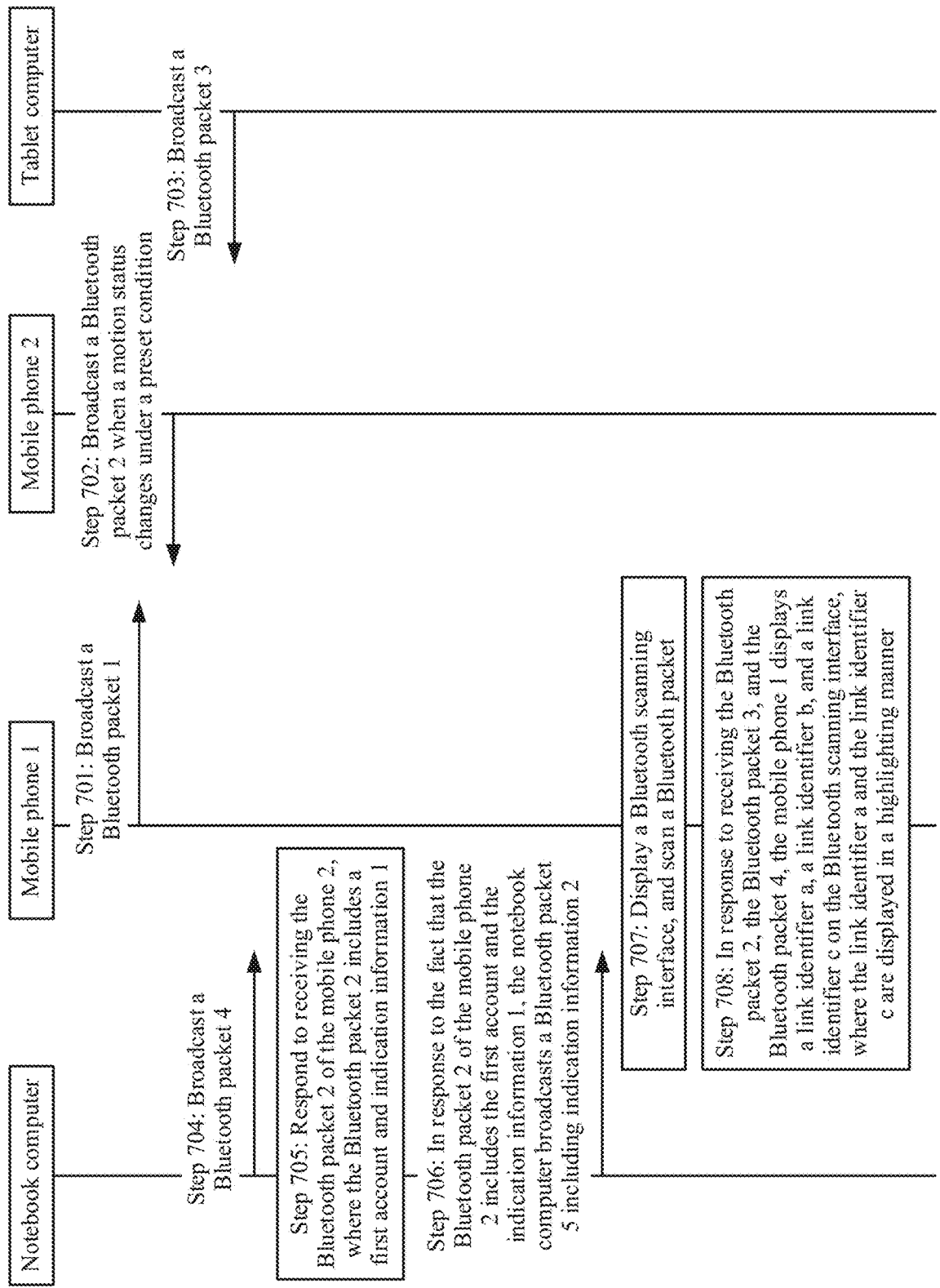
FIG. 7 is a flowchart of a method for displaying a Bluetooth device identifier according to an embodiment of this application.

FIG. 7 is a flowchart of another method for displaying a Bluetooth device identifier according to an embodiment of this application.

It should be noted that, in this embodiment of this application, an example in which a Bluetooth communication range includes an electronic device 1, an electronic device 2, an electronic device 3, and an electronic device 4 is still used. Each electronic device is provided with a Bluetooth module. It is assumed that the electronic device 1 is a mobile phone 1, the electronic device 2 is a mobile phone 2, the electronic device 3 is a notebook computer, and the electronic device 4 is a tablet computer.

Specifically, the method may include step 701 to step 708.

It should be noted that, in this embodiment of this application, the mobile phone 2 logs in to a first account, and the notebook computer also logs in to the first account.

Step 701: The mobile phone 1 broadcasts a Bluetooth packet 1.

The Bluetooth packet 1 may include information such as an access address of the mobile phone 1.

In some embodiments, the Bluetooth packet 1 may further include a Bluetooth name of the mobile phone 1. For example, the Bluetooth name of the mobile phone 1 is "A' shouji1".

In addition, the Bluetooth packet 1 broadcast by the mobile phone 1 may further include an account logged in to by the mobile phone 1. For example, the mobile phone 1 logs in to a second account, and the Bluetooth packet 1 may include the second account.

For example, it is assumed that the second account is represented as "account is C", information included in a reserved bit in the Bluetooth packet 3 is "account is C".

Step 702: The mobile phone 2 broadcasts a Bluetooth packet 2 when a motion status of the mobile phone 2 changes under a preset condition.

The Bluetooth packet 2 includes indication information 1 and the first account. The indication information 1 is used to display, in a highlighting manner, a link identifier corresponding to the mobile phone 2, and the first account is used to indicate that the mobile phone 2 logs in to the first account.

In some embodiments, a reserved bit in the Bluetooth packet 2 may further include the first account (for example, an account A) currently logged in to by the mobile phone 2. Specifically, when the mobile phone 2 broadcasts the Bluetooth packet 2, the mobile phone 2 detects that the system currently logs in to the account A (account is A), and stores the account A in the reserved bit in the Bluetooth packet 2. In this way, another device that receives the Bluetooth packet 2 may identify, based on information in the reserved bit in the Bluetooth packet 2, that the system of the mobile phone 2 logs in to the account A.

For example, if the mobile phone 2 logs in to the account A (account is A), the reserved bit in the Bluetooth packet broadcast by the mobile phone 2 includes "account is A".

For example, if the mobile phone 2 detects that a motion status of the mobile phone 2 changes under the preset condition, and the system of the mobile phone 2 currently logs in to the account A, information included in a reserved bit in the Bluetooth packet 1 of the mobile phone 1 is "motion is x, and account is A". That is, the Bluetooth packet 2 includes the indication information 1 and the first account.

In some embodiments, the Bluetooth packet 2 may further include a Bluetooth name of the mobile phone 2. For example, the Bluetooth name of the mobile phone 2 is "Linda's shouji2".

Step 703: The tablet computer broadcasts a Bluetooth packet 3.

The Bluetooth packet 3 may include information such as an access address of the tablet computer.

In some embodiments, the Bluetooth packet 3 may further include a Bluetooth name of the tablet computer. For example, the Bluetooth name of the tablet computer is "cay's pad Pro".

In addition, the Bluetooth packet 3 may further include an account logged in to by the tablet computer. For example, the tablet computer logs in to a third account, and the Bluetooth packet 3 may further include the third account.

For example, it is assumed that the third account is represented as "account is B", information included in a reserved bit in the Bluetooth packet 3 is "account is B".

Step 704: The notebook computer broadcasts a Bluetooth packet 4.

The Bluetooth packet 4 may include information such as the first account and an access address of the notebook computer.

For example, it is assumed that the first account is represented as "account is A", information included in a reserved bit in the Bluetooth packet 4 is "account is A".

In some embodiments, the Bluetooth packet 4 may further include a Bluetooth name of the notebook computer. For example, the Bluetooth name of the notebook computer is "Linda's matebook".

It may be understood that the Bluetooth packet 2 broadcast by the mobile phone 2 includes first indication information and the first account, the Bluetooth packet 4 broadcast by the notebook computer includes the first account, and the Bluetooth packet 3 broadcast by the tablet computer does not include the first indication information or the first account.

In a first case, after the notebook computer receives the Bluetooth packet 2 broadcast by the mobile phone 2, the notebook computer broadcasts the Bluetooth packet.

Step 705: The notebook computer responds to receiving the Bluetooth packet 2 of the mobile phone 2, where the Bluetooth packet 2 includes the first account and the indication information 1.

If Bluetooth of the notebook computer is in an enabled state, the notebook computer may receive the Bluetooth packet 1, the Bluetooth packet 2, and the Bluetooth packet 3. That is, when the Bluetooth of the notebook computer is in the enabled state, the notebook computer may determine information in the Bluetooth packet 2 based on a received Bluetooth packet broadcast by another electronic device.

Step 706: In response to the fact that the Bluetooth packet 2 of the mobile phone 2 includes the first account and the indication information 1, the notebook computer broadcasts a Bluetooth packet 5 including indication information 2.

It may be understood that the indication information 2 is the second indication information.

The indication information 2 is used to indicate to display, in the highlighting manner, a link identifier corresponding to the notebook computer.

It may be understood that if the motion status of the mobile phone 2 changes under the preset condition, the mobile phone 2 broadcasts the Bluetooth packet 2 including the indication information 1. Actually, a motion status of the notebook computer does not change under a condition, and the Bluetooth packet broadcast by the notebook computer includes the indication information 2, so that after receiving the Bluetooth packet broadcast by the notebook computer, another electronic device may display, in the highlighting manner, the link identifier corresponding to the notebook computer.

The indication information 2 and the indication information 1 have a same function, and are both used to indicate to display, in the highlighting manner, a link identifier corresponding to a Bluetooth packet. In this case, content of the indication information 1 and content of the indication information 2 may be the same. For example, the indication information 1 is "motion is x", and the indication information 2 is also "motion is x".

For example, information included in the reserved bit in the Bluetooth packet 2 is "motion is x, and account is A". If the notebook computer responds to that account information (that is, account is A) in the Bluetooth packet 2 is the same as an account logged in to by a system of the notebook computer, the notebook computer may use the indication information 1 (that is, motion is x) in the reserved bit in the Bluetooth packet 2 as indication information (that is, the indication information 2) of the Bluetooth packet broadcast by the notebook computer. In other words, the motion status of the notebook computer does not change under the preset condition, and the notebook computer may use the login account information of the notebook computer and the indication information 1 in the Bluetooth packet as the indication information of the Bluetooth packet broadcast by the notebook computer. In this way, information in a reserved bit in the Bluetooth packet 5 broadcast by the notebook computer is "motion is x, and account is A". Herein, "motion is x" is the indication information 1 in the Bluetooth packet 2, and "account is A" is the first account logged in to by the notebook computer.

Step 707: The mobile phone 1 displays a Bluetooth scanning interface, and scans a Bluetooth packet.

Step 708: In response to receiving the Bluetooth packet 2, the Bluetooth packet 3, and the Bluetooth packet 5, the mobile phone 1 displays a link identifier a, a link identifier b, and a link identifier c on the Bluetooth scanning interface. The link identifier a and the link identifier c are displayed in the highlighting manner.

The mobile phone 2 is corresponding to the link identifier a, the tablet computer is corresponding to the link identifier b, and the notebook computer is corresponding to the link identifier c.

In some embodiments, the mobile phone 1 receives a Bluetooth packet, and may identify information included in a reserved bit in the Bluetooth packet. In this way, the mobile phone 1 may determine, based on the information in the reserved bit in the Bluetooth packet, whether the Bluetooth packet includes the indication information 1 and an account logged in to by a system of a device that broadcasts the Bluetooth packet.

For example, the mobile phone 1 identifies that the information in the reserved bit in the Bluetooth packet 2 is "motion is x, and account is A". In this way, the mobile phone 1 may determine, based on the information in the reserved bit, whether the Bluetooth packet includes the indication information 1 and the first account. The mobile phone 1 identifies that the information in the reserved bit in the Bluetooth packet 5 is "motion is x, and account is A". In this way, the mobile phone 1 may determine, based on the information in the reserved bit, whether the Bluetooth packet includes the indication information 1 (the indication information 2) and the first account. The mobile phone 1 identifies that the information in the reserved bit in the Bluetooth packet 3 is "account is B". In this way, the mobile phone 1 may determine, based on the information in the reserved bit, whether the Bluetooth packet includes the third account (account B).

It may be understood that, if both the Bluetooth packet 2 and the Bluetooth packet 5 include the indication information 1 (motion is x), both the link identifier a and the link identifier c are displayed by the mobile phone 1 in the highlighting manner.

It should be noted that step 707 and step 708 are respectively corresponding to step 305 and step 306 in the foregoing implementation. Details are not described herein again.

In a second case, the notebook computer does not receive the Bluetooth packet 2 broadcast by the mobile phone 2, and the notebook computer broadcasts the Bluetooth packet.

Because a motion status of an electronic device changes under the preset condition, the electronic device may broadcast the Bluetooth packet including indication information. Assuming that the user of the mobile phone 1 wants to control the mobile phone 1 to establish a Bluetooth connection to the notebook computer, a motion status of the notebook computer is inconvenient to change.

In some embodiments, the mobile phone 1 may display, in a same display manner, electronic devices to which a same account is logged in.

For example, the mobile phone 1 identifies that the information in the reserved bit in the Bluetooth packet 2 is "motion is x, and account is A". In this way, the mobile phone 1 may determine, based on the information in the reserved bit, whether the Bluetooth packet includes the indication information 1 and the first account. The mobile phone 1 identifies that the information in the reserved bit in the Bluetooth packet 5 is "account is A". In this way, the mobile phone 1 may determine, based on the information in the reserved bit, whether the Bluetooth packet includes the first account. The mobile phone 1 identifies that the information in the reserved bit in the Bluetooth packet 3 is "account is B". In this way, the mobile phone 1 may determine, based on the information in the reserved bit, whether the Bluetooth packet includes the third account (account B). The mobile phone 1 responds to that both the Bluetooth packet 2 and the Bluetooth packet 5 include the first account. If neither the Bluetooth packet 2 nor the Bluetooth packet 5 includes the indication information 1, neither the link identifier a corresponding to the Bluetooth packet 2 nor the link identifier c corresponding to the Bluetooth packet 5 is displayed in the highlighted manner. If the Bluetooth packet 2 or the Bluetooth packet 5 includes the indication information 1, both the link identifier a corresponding to the Bluetooth packet 2 and the link identifier c corresponding to the Bluetooth packet 5 are displayed in the highlighted manner.

That is, when Bluetooth packets broadcast by a plurality of devices all include a same account (for example, the account A), provided that a reserved bit of one Bluetooth packet in Bluetooth packets with a same account includes the indication information 1, link identifiers corresponding to the Bluetooth packets with the same account may be displayed in the highlighted manner.

For example, when the mobile phone 1 responds to receiving the Bluetooth packet 2, the Bluetooth packet 3, and the Bluetooth packet 4, the mobile phone 1 may determine that the Bluetooth packet 2 includes the indication information 1 and the first account, and the Bluetooth packet 4 includes the first account. In response to the fact that the Bluetooth packet 2 includes the indication information 1, the mobile phone 1 displays the link identifier a in the highlighting manner. In addition, in response to the fact that both the Bluetooth packet 2 and the Bluetooth packet 4 include the first account, the mobile phone 1 may display the link identifier a and the link identifier c in the highlighting manner on the Bluetooth scanning interface.

That is, step 705 and step 706 do not need to be performed, and step 707 and step 708 may be directly performed after step 704.

Specifically, on the Bluetooth scanning interface of the mobile phone 1, the link identifier a and the link identifier c are displayed before another link identifier (for example, the link identifier b). That is, the link identifier c corresponding to the notebook computer may be displayed before the link identifier b and after the link identifier a; or the link identifier c may be displayed before the link identifier a and the link identifier b.

Alternatively, both the link identifier a and the link identifier c are selected on the Bluetooth scanning interface of the mobile phone 1.

Alternatively, both the link identifier a and the link identifier c on the Bluetooth scanning interface of the mobile phone 1 include a preset identifier.

Alternatively, on the Bluetooth scanning interface of the mobile phone 1, the link identifier c includes the preset identifier, and the link identifier c is displayed before another link identifier. In other words, on the Bluetooth scanning interface of the mobile phone 1, both the link identifier a and the link identifier c are displayed in the highlighting manner, and have same display formats.

Figure 8A:
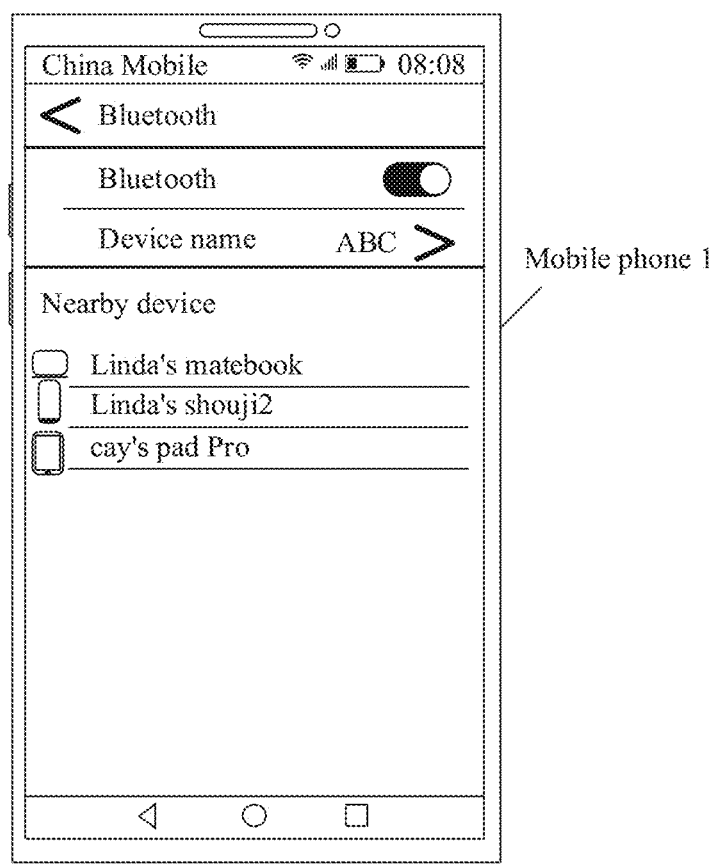
FIG. 8A is a schematic diagram of displaying another Bluetooth scanning interface according to an embodiment of this application.
Figure 8B:
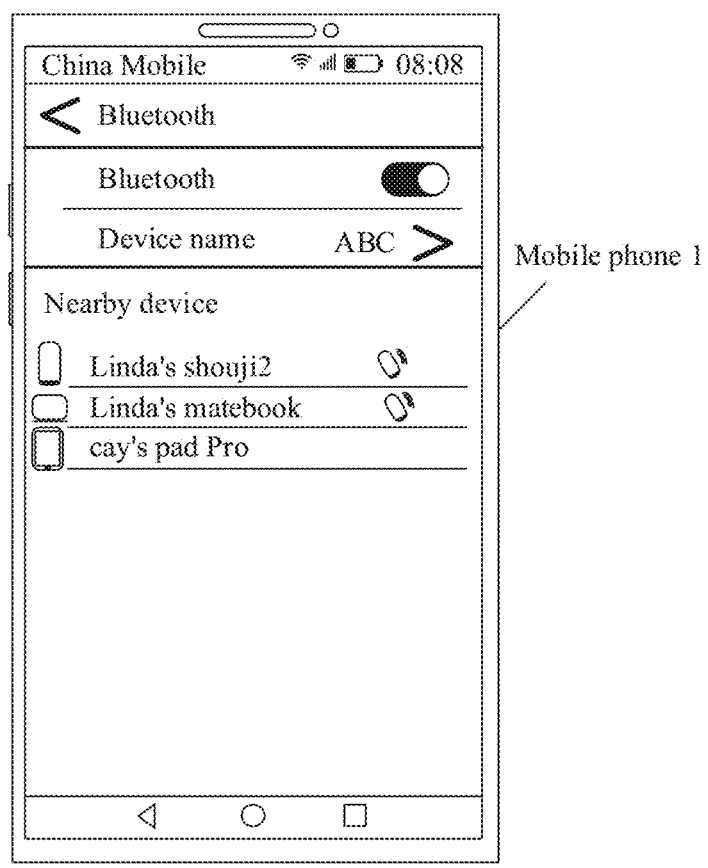
FIG. 8B is a schematic diagram of displaying another Bluetooth scanning interface according to an embodiment of this application.
Figure 8C:
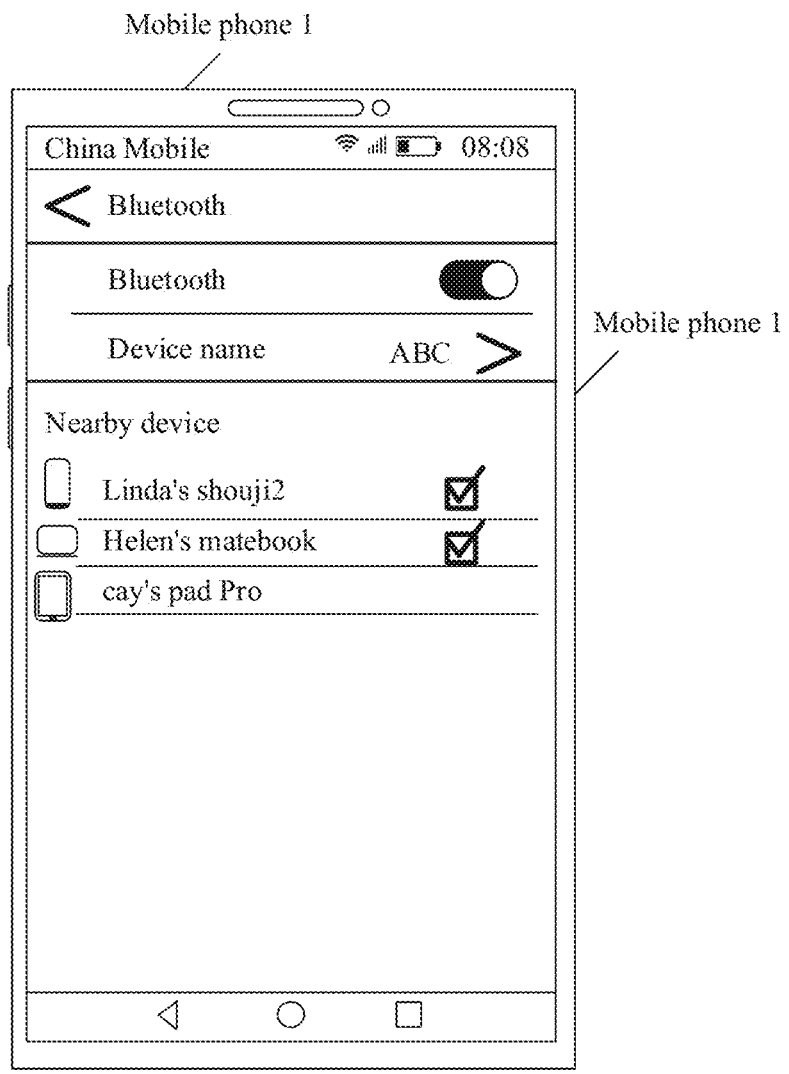
FIG. 8C is a schematic diagram of displaying another Bluetooth scanning interface according to an embodiment of this application.
Figure 8D:
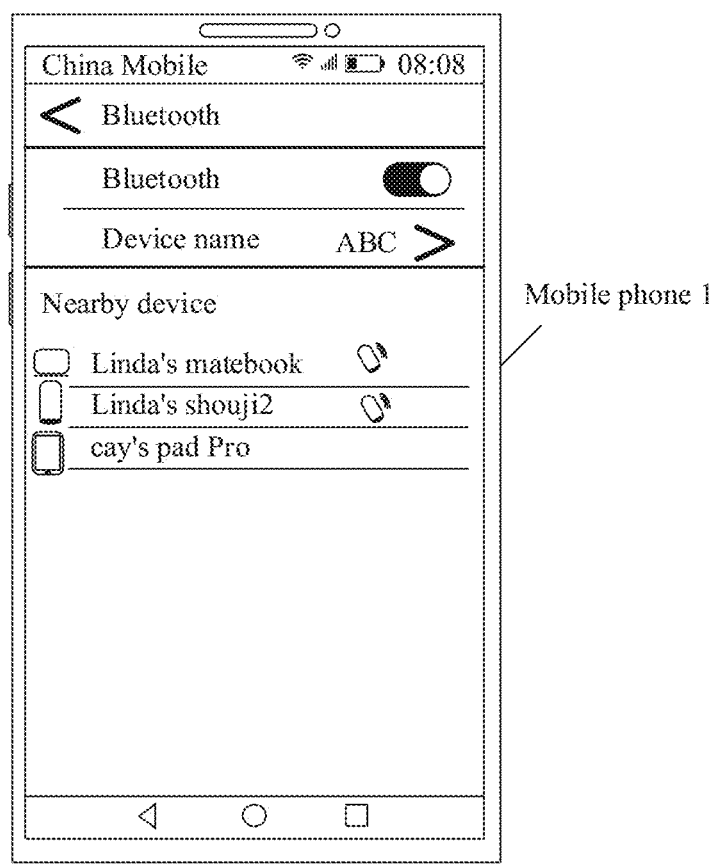
FIG. 8D is a schematic diagram of displaying another Bluetooth scanning interface according to an embodiment of this application.
Figure 8E:
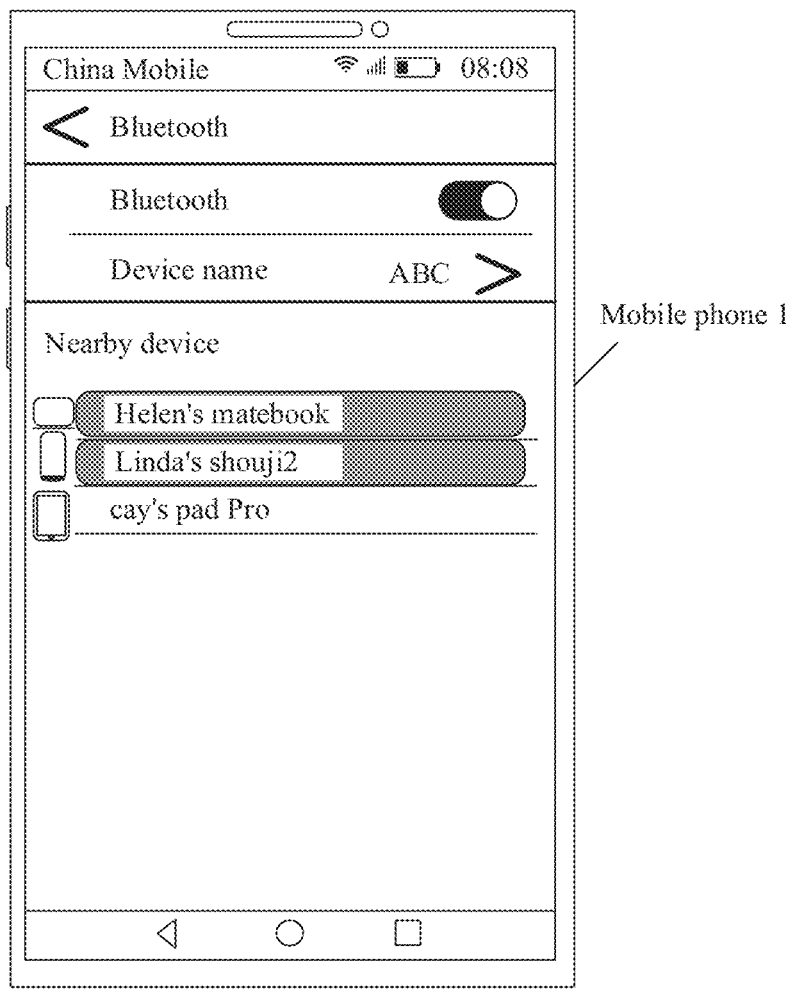
FIG. 8E is a schematic diagram of displaying another Bluetooth scanning interface according to an embodiment of this application.

For example, it is assumed that the link identifier a is "Linda's shouji2", the link identifier b corresponding to the tablet computer is "cay's pad Pro", and the link identifier c corresponding to the notebook computer is "Linda's matebook". As shown in FIG. 8A, the Bluetooth scanning interface of the mobile phone 1 includes the link identifier a (Linda's shouji2), the link identifier c (Linda's matebook), and the link identifier b (cay's pad Pro). The link identifier a and the link identifier c are located before the link identifier b. As shown in FIG. 8B, the Bluetooth scanning interface of the mobile phone 1 includes Linda's shouji2, Linda's matebook, and cay's pad Pro. Both the link identifier a and the link identifier c are corresponding to a preset identifier 601. As shown in FIG. 8C, the Bluetooth scanning interface of the mobile phone 1 includes Linda's shouji2, Linda's matebook, and cay's pad Pro. Both the link identifier a and the link identifier c are selected. As shown in FIG. 8D, the Bluetooth scanning interface of the mobile phone 1 includes Linda's shouji2, Linda's matebook, and cay's pad Pro. The link identifier a and the link identifier c are located before a third link identifier, and both the link identifier a and the link identifier c are corresponding to the preset identifier 601. As shown in FIG. 8E, the Bluetooth scanning interface of the mobile phone 1 includes Linda's shouji2, Linda's matebook, and cay's pad Pro. A color of a display box in which the link identifier a is located and a color of a display box in which the link identifier c is located are the same, and are different from a color of a display box in which the link identifier b is located.

According to the method in this embodiment of this application, an electronic device whose motion status cannot change under the condition may also broadcast the Bluetooth packet including the second indication information. When the mobile phone 1 displays the Bluetooth scanning interface, the electronic device may be displayed in the highlighting manner, so that the user can quickly find the Bluetooth device for Bluetooth pairing.

Figure 9A:
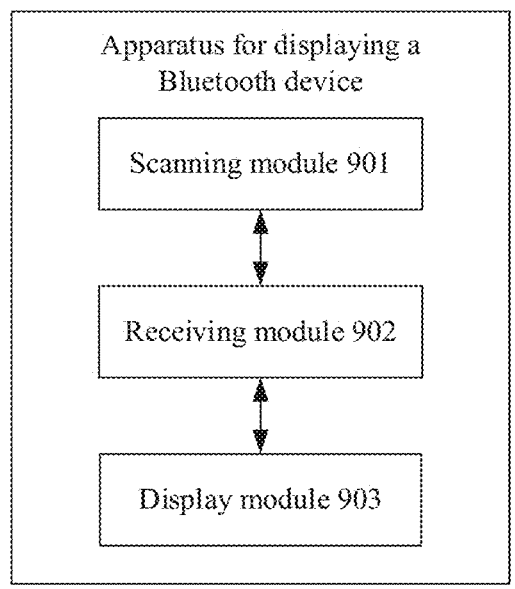
FIG. 9A is a schematic diagram of a structure of an apparatus for displaying a Bluetooth device according to an embodiment of this application.

An embodiment of this application further provides an apparatus for displaying a Bluetooth device, corresponding to the mobile phone 1 in the foregoing embodiments. FIG. 9A is a schematic diagram of a possible structure of an apparatus for displaying a Bluetooth device. The apparatus for displaying a Bluetooth device includes a scanning module 901, a receiving module 902, and a display module 903.

The scanning module 901 is configured to scan a Bluetooth packet when a mobile phone 1 displays a Bluetooth scanning interface, for example, may be configured to perform step 305 in FIG. 3B, and/or may be configured to perform another process of the technology described in this specification.

The receiving module 902 is configured to receive a Bluetooth packet 2 broadcast by a mobile phone 2, a Bluetooth packet 3 broadcast by a tablet computer, and a Bluetooth packet 4 broadcast by a notebook computer.

The display module 903 is configured to display, in response to receiving the Bluetooth packet 2, the Bluetooth packet 3, and the Bluetooth packet 4, a link identifier a, a link identifier b, and a link identifier c on the Bluetooth scanning interface. The link identifier a corresponds to the mobile phone 2, the link identifier b corresponds to the tablet computer, and the link identifier c corresponds to the notebook computer.

The display module may display the link identifier a in a highlighting manner, or the display module may further display the link identifier a and the link identifier c in a highlighting manner.

Figure 9B:
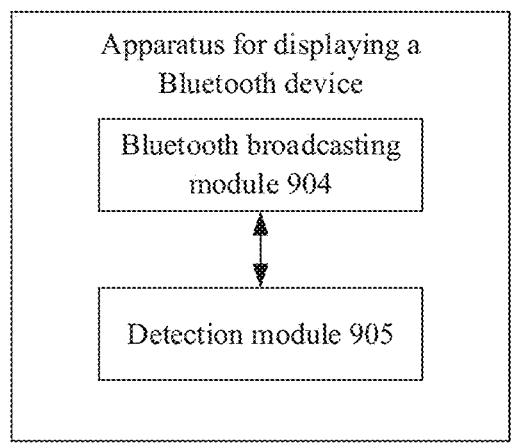
FIG. 9B is a schematic diagram of a structure of another apparatus for displaying a Bluetooth device according to an embodiment of this application.

An embodiment of this application further provides an apparatus for displaying a Bluetooth device, corresponding to the mobile phone 2 in the foregoing embodiments. FIG. 9B is a schematic diagram of a possible structure of an apparatus for displaying a Bluetooth device. The apparatus for displaying a Bluetooth device includes a Bluetooth broadcasting module 904 and a detection module 905.

The Bluetooth broadcasting module 904 is configured to broadcast a Bluetooth packet 2. The Bluetooth packet 2 includes indication information 1, and the indication information 1 is used to indicate to display, in a highlighting manner, a link identifier corresponding to a mobile phone 2.

Because a motion status of the mobile phone 2 changes under a preset condition, the Bluetooth broadcasting module 904 broadcasts the Bluetooth packet 2 including the indication information 1. The detection module 905 is configured to detect that the motion status of the mobile phone 2 changes under a condition.

It may be understood that, to implement the foregoing functions, the electronic device includes a corresponding hardware structure and/or software module for performing each of the functions. A person skilled in the art should be easily aware that, in combination with the examples described in embodiments disclosed in this specification, units, algorithms, and steps may be implemented by hardware or a combination of hardware and computer software in embodiments of this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of embodiments of this application.

In embodiments of this application, the electronic device may be divided into function modules based on the foregoing method examples. For example, each function module may be obtained through division based on each corresponding function, or two or more functions may be integrated into one processing module. The integrated module may be implemented in a form of hardware, or may be implemented in a form of a software function module. It should be noted that, in embodiments of this application, module division is an example, and is merely a logical function division. During actual implementation, another division manner may be used.

Figure 10:
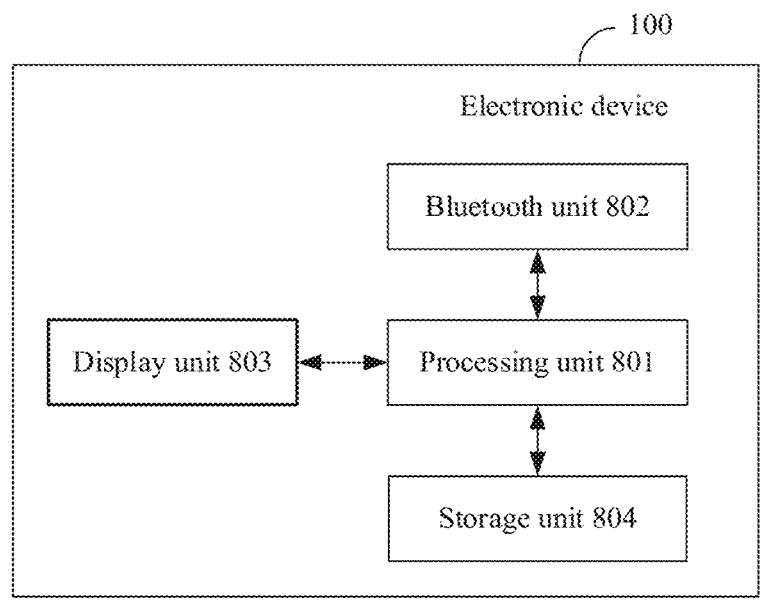
FIG. 10 is a schematic diagram of structure composition of an electronic device according to an embodiment of this application.

When an integrated unit is used, FIG. 10 is a schematic diagram of a possible structure of an electronic device in the foregoing embodiments. The electronic device 100 includes a processing unit 801, a Bluetooth unit 802, a display unit 803, and a storage unit 804.

The processing unit 801 is configured to control and manage an action of the electronic device 100, for example, may be configured to perform step 305 in FIG. 3B, and/or may be configured to perform another process of the technology described in this specification.

The Bluetooth unit 802 is configured to broadcasts a Bluetooth packet in a Bluetooth connection of the electronic device, for example, may be configured to perform step 301 in FIG. 3B, and/or may be configured to perform another process of the technology described in this specification.

The display unit 803 is configured to display an interface of the electronic device, for example, may be configured to display a Bluetooth scanning interface, and for example, may be configured to perform step 306 in FIG. 3B, and/or may be configured to perform another process of the technology described in this specification.

The storage unit 804 is configured to store program code and data of the electronic device 100, for example, may be configured to store a desktop layout file.

Certainly, unit modules in the electronic device 100 include but are not limited to the processing unit 801, the Bluetooth unit 802, the display unit 803, and the storage unit 804. For example, the electronic device 100 may further include an audio unit, a communication unit, and the like. The audio unit is configured to capture a voice sent by a user and play the voice. The communication unit is configured to support communication between the electronic device 100 and another apparatus.

The processing unit 801 may be a processor or a controller, for example, may be a central processing unit (central processing unit, CPU), a digital signal processor (digital signal processor, DSP), an application-specific integrated circuit (application-specific integrated circuit, ASIC), a field programmable gate array (field programmable gate array, FPGA) or another programmable logic device, a transistor logic device, a hardware component, or any combination thereof. The processor may include an application processor and a baseband processor. The processor may implement or execute various example logical blocks, modules, and circuits described with reference to content disclosed in this application. The processor may be a combination of processors implementing a computing function, for example, a combination of one or more microprocessors, or a combination of the DSP and a microprocessor. The storage unit 804 may be a memory. The audio unit may include a microphone, a speaker, a receiver, and the like. The communication unit may be a transceiver, a transceiver circuit, a communication interface, or the like.

For example, the processing unit 801 is a processor (the processor 210 shown in FIG. 2A), the Bluetooth unit 802 may be a Bluetooth module (the Bluetooth module 261 shown in FIG. 2A), the display unit 803 is a display (the display 294 shown in FIG. 2A, where the display 294 may be a touchscreen, and a display panel and a touch panel may be integrated into the touchscreen), and the storage unit 804 may be a memory (the internal memory 221 shown in FIG. 2A). The electronic device 100 provided in this embodiment of this application may be the electronic device 200 shown in FIG. 2A. The processor, the memory, the communication interface, and the like may be coupled together, for example, connected through a bus.

Figure 11:
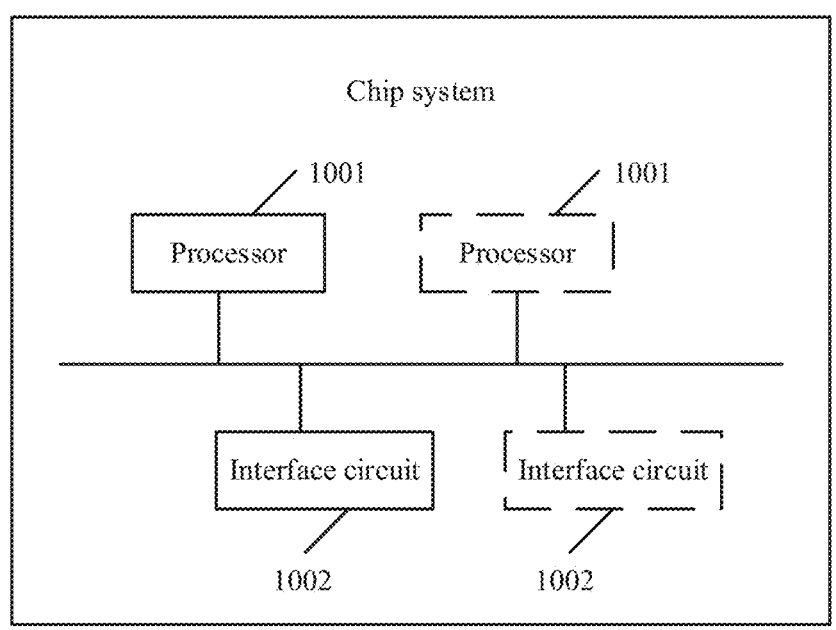
FIG. 11 is a schematic diagram of a structure of a chip system according to an embodiment of this application.

An embodiment of this application further provides a chip system. As shown in FIG. 11, the chip system includes at least one processor 1001 and at least one interface circuit 1002. The processor 1001 and the interface circuit 1002 may be interconnected through a line. For example, the interface circuit 1002 may be configured to receive a signal from another apparatus (for example, a memory of an electronic device). For another example, the interface circuit 1002 may be configured to send a signal to another apparatus (for example, the processor 1001). For example, the interface circuit 1002 may read instructions stored in the memory, and send the instructions to the processor 1001. When the instructions are executed by the processor 1001, the electronic device is enabled to perform the steps in the foregoing embodiments. Certainly, the chip system may further include another discrete device. This is not specifically limited in this embodiment of this application.

An embodiment of this application further provides a computer storage medium. The computer storage medium includes computer instructions. When the computer instructions are run on the foregoing electronic device, the electronic device is enabled to perform the functions or the steps performed by the mobile phone in the foregoing method embodiments.

An embodiment of this application further provides a computer program product. When the computer program product runs on a computer, the computer is enabled to perform functions or steps performed by a mobile phone in the foregoing method embodiments.

The foregoing descriptions about implementations allow a person skilled in the art to clearly understand that, for the purpose of convenient and brief description, division of the foregoing functional modules is used as an example for illustration. In actual application, the foregoing functions can be allocated to different modules and implemented based on a requirement, that is, an inner structure of an apparatus is divided into different functional modules to implement all or some of the functions described above.

In the several embodiments provided in this application, it should be understood that the disclosed apparatus and method may be implemented in other manners. For example, the described apparatus embodiment is merely an example. For example, the module or division into the units is merely logical function division and may be other division during actual implementation. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed on different places. Some or all of the units may be selected based on actual requirements to achieve the objectives of the solutions of embodiments.

In addition, function units in embodiments of this application may be integrated into one processing unit, each of the units may exist alone physically, or two or more units may be integrated into one unit. The integrated unit may be implemented in a form of hardware, or may be implemented in a form of a software function unit.

When the integrated unit is implemented in the form of a software function unit and sold or used as an independent product, the integrated unit may be stored in a readable storage medium. Based on such an understanding, the technical solutions of this application essentially, or the part contributing to the conventional technology, or all or some of the technical solutions may be implemented in the form of a software product. The software product is stored in a storage medium and includes several instructions for instructing a device (which may be a single-chip microcomputer, a chip or the like) or a processor (processor) to perform all or some of the steps of the methods described in embodiments of this application. The foregoing storage medium includes any medium that can store program code, such as a USB flash drive, a removable hard disk, a read-only memory (read-only memory, ROM), a random access memory (random access memory, RAM), a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A method comprising:
    detecting, by a first electronic device, that a first motion status of the first electronic device has changed under a preset condition;
    broadcasting, by the first electronic device after detecting that the first motion status has changed under the preset condition, a first BLUETOOTH packet comprising first indication information, wherein the first indication information instructs to display, in a highlighting manner, a first link identifier corresponding to the first electronic device;
    broadcasting, by a second electronic device, a second BLUETOOTH packet;
    displaying, by a third electronic device, a BLUETOOTH scanning interface;
    scanning, by the third electronic device, for BLUETOOTH packets;
    receiving, by the third electronic device in response to the scanning, the first BLUETOOTH packet;
    displaying, by the third electronic device, the first link identifier in the highlighting manner and on the BLUETOOTH scanning interface in response to receiving the first BLUETOOTH packet and in response to the first BLUETOOTH packet comprising the first indication information;
    receiving, by the third electronic device in response to the scanning, the second BLUETOOTH packet; and
    displaying, by the third electronic device, a second link identifier on the BLUETOOTH scanning interface in response to receiving the second BLUETOOTH packet,
    wherein the second link identifier corresponds to the second electronic device.

2. The method of claim 1, wherein the highlighting manner comprises:

displaying the first link identifier before the second link identifier;
displaying the first link identifier being selected; or
displaying the first link identifier in a display manner different from that of the second link identifier.

3. The method of claim 1, further comprising further displaying, by the third electronic device, the first link identifier in the highlighting manner on the BLUETOOTH scanning interface within a first preset duration starting from a moment when the third electronic device receives the first BLUETOOTH packet.

4. The method of claim 1, wherein before displaying the first link identifier and the second link identifier, the method further comprises displaying, by the third electronic device, motion prompt information on the BLUETOOTH scanning interface, and wherein the motion prompt information indicates a second motion status that meets the preset condition.

5. The method of claim 1, further comprising broadcasting, by the first electronic device, the first BLUETOOTH packet within a second preset duration starting from a moment when the first electronic device detects that the first motion status has changed under the preset condition.

6. The method of claim 5, further comprising broadcasting, by the first electronic device, a third BLUETOOTH packet after the second preset duration, wherein the third BLUETOOTH packet does not comprise the first indication information.

7. The method of claim 1, further comprising:
logging in, by the first electronic device, to a first account;
receiving, by a fourth electronic device, the first BLUETOOTH packet, wherein the first BLUETOOTH packet further comprises the first account;
broadcasting, by the fourth electronic device and in response to the first BLUETOOTH packet comprising the first indication information and the fourth electronic device logging in to the first account, a fourth BLUETOOTH packet comprising second indication information, wherein the second indication information instructs to display, in the highlighting manner, a third link identifier corresponding to the fourth electronic device;
receiving, by the third electronic device in response to the scanning, the fourth BLUETOOTH packet; and
displaying, by the third electronic device, the third link identifier in the highlighting manner on the BLUETOOTH scanning interface in response to receiving the fourth BLUETOOTH packet.

8. The method of claim 1, further comprising:
logging in, by the first electronic device, to a first account, wherein the first BLUETOOTH packet further comprises the first account;
broadcasting, by a fourth electronic device, a fourth BLUETOOTH packet comprising the first account;
logging in, by the fourth electronic device, to the first account;
receiving, by the third electronic device in response to the scanning, the fourth BLUETOOTH packet; and
displaying, by the third electronic device, a third link identifier in the highlighting manner and on the BLUETOOTH scanning interface in response to receiving the fourth BLUETOOTH packet and in response to the fourth BLUETOOTH packet comprising the first account,
wherein the third link identifier corresponds to the fourth electronic device.

9. A method implemented by a third electronic device, wherein the method comprises:

displaying a BLUETOOTH scanning interface;
scanning for BLUETOOTH packets;
receiving, from a first electronic device and in response to scanning for the BLUETOOTH packets, a first BLUETOOTH packet comprising indication information, wherein the indication information instructs to display, in a highlighting manner, a first link identifier corresponding to the first electronic device;
receiving, from a second electronic device and in response to scanning for the BLUETOOTH packets, a second BLUETOOTH packet;
displaying motion prompt information on the BLUETOOTH scanning interface, wherein the motion prompt information indicates a motion status that meets a preset condition;
displaying, when the motion prompt information indicates the motion status that meets the preset condition, the first link identifier in the highlighting manner and on the BLUETOOTH scanning interface in response to receiving the first BLUETOOTH packet and in response to the first BLUETOOTH packet comprising the indication information; and
displaying a second link identifier on the BLUETOOTH scanning interface in response to receiving the second BLUETOOTH packet, wherein the second link identifier corresponds to the second electronic device.

10. The method of claim 9, further comprising further displaying the first link identifier in the highlighting manner on the BLUETOOTH scanning interface within a preset duration starting from a moment when the third electronic device receives the first BLUETOOTH packet.

11. The method of claim 9, wherein the first electronic device has logged in to a first account, wherein the first BLUETOOTH packet further comprises the first account, and wherein the method further comprises:
receiving, from a fourth electronic device and in response to scanning for the BLUETOOTH packets, a fourth BLUETOOTH packet comprising the first account; and
displaying a third link identifier in the highlighting manner and on the BLUETOOTH scanning interface in response to receiving the fourth BLUETOOTH packet and in response to the fourth BLUETOOTH packet comprising the first account, wherein the third link identifier corresponds to the fourth electronic device.

12. The method of claim 9, wherein the highlighting manner comprises:
displaying the first link identifier before the second link identifier;
displaying the first link identifier being selected; or
displaying the first link identifier in a display manner different from that of the second link identifier.

13. A third electronic device comprising:
a memory configured to store instructions; and
a processor coupled to the memory and configured to execute the instructions to cause the third electronic device to:
display a BLUETOOTH scanning interface;
scan for BLUETOOTH packets;
receive, from a first electronic device and in response to scanning for the BLUETOOTH packets, a first BLUETOOTH packet comprising indication information, wherein the indication information instructs to display, in a highlighting manner, a first link identifier corresponding to the first electronic device;
receive, from a second electronic device and in response to scanning for the BLUETOOTH packets, a second BLUETOOTH packet;

display motion prompt information on the BLUETOOTH scanning interface, wherein the motion prompt information indicates a motion status that meets a preset condition;

display, when the motion prompt information indicates the motion status that meets the preset condition, the first link identifier in the highlighting manner and on the BLUETOOTH scanning interface in response to receiving the first BLUETOOTH packet and in response to the first BLUETOOTH packet comprising the indication information; and display a second link identifier on the BLUETOOTH scanning interface in response to receiving the second BLUETOOTH packet, wherein the second link identifier corresponds to the second electronic device.

14. The third electronic device of claim 13, wherein the processor is further configured to execute the instructions to cause the third electronic device to further display the first link identifier in the highlighting manner on the BLUETOOTH scanning interface within a preset duration starting from a moment when the third electronic device receives the first BLUETOOTH packet.

15. The third electronic device of claim 13, wherein the first electronic device has logged in to a first account, wherein the first BLUETOOTH packet further comprises the first account, and wherein the processor is further configured to execute the instructions to cause the third electronic device to:

receive, from a fourth electronic device and in response to scanning for the BLUETOOTH packets, a fourth BLUETOOTH packet comprising the first account; and display a third link identifier in the highlighting manner and on the BLUETOOTH scanning interface in response to receiving the fourth BLUETOOTH packet and in response to the fourth BLUETOOTH packet comprising the first account, wherein the third link identifier corresponds to the fourth electronic device.

16. The third electronic device of claim 13, wherein the highlighting manner comprises:

displaying the first link identifier before the second link identifier;

displaying the first link identifier being selected; or displaying the first link identifier in a display manner different from that of the second link identifier.

17. A computer program product comprising computer-executable instructions that are stored on a non-transitory computer readable medium and that, when executed by a processor, cause a third electronic device to:

display a BLUETOOTH scanning interface;

scan for BLUETOOTH packets;

receive, from a first electronic device and in response to scanning for the BLUETOOTH packets, a first BLUETOOTH packet comprising indication information, wherein the indication information instructs to display, in a highlighting manner, a first link identifier corresponding to the first electronic device;

receive, from a second electronic device and in response to scanning for the BLUETOOTH packets, a second BLUETOOTH packet;

display motion prompt information on the BLUETOOTH scanning interface, wherein the motion prompt information indicates a motion status that meets a preset condition;

display, when the motion prompt information indicates the motion status that meets the preset condition, the first link identifier in the highlighting manner and on the BLUETOOTH scanning interface in response to receiving the first BLUETOOTH packet and in response to the first BLUETOOTH packet comprising the indication information; and display a second link identifier on the BLUETOOTH scanning interface in response to receiving the second BLUETOOTH packet, wherein the second link identifier corresponds to the second electronic device.

18. The computer program product of claim 17, wherein the computer-executable instructions further cause the third electronic device to further display the first link identifier in the highlighting manner on the BLUETOOTH scanning interface within a preset duration starting from a moment when the third electronic device receives the first BLUETOOTH packet.

19. The computer program product of claim 17, wherein the first electronic device has logged in to a first account, wherein the first BLUETOOTH packet further comprises the first account, and wherein the computer-executable instructions further cause the third electronic device to:

receive, from a fourth electronic device and in response to scanning for the BLUETOOTH packets, a fourth BLUETOOTH packet comprising the first account; and display a third link identifier in the highlighting manner and on the BLUETOOTH scanning interface in response to receiving the fourth BLUETOOTH packet and in response to the fourth BLUETOOTH packet comprising the first account, wherein the third link identifier corresponds to the fourth electronic device.

20. The computer program product of claim 17, wherein the highlighting manner comprises:

displaying the first link identifier before the second link identifier;

displaying the first link identifier being selected; or displaying the first link identifier in a display manner different from that of the second link identifier.

\* \* \* \* \*